United States Patent [19]

Miyagawa

[11] Patent Number: 4,874,679
[45] Date of Patent: Oct. 17, 1989

[54] STORAGE BATTERY WITH INDICATING DEVICE

[75] Inventor: Shiro Miyagawa, Osaka, Japan

[73] Assignee: Miyagawa Kasei Industry Co., Ltd., Osaka, Japan

[21] Appl. No.: 217,543

[22] Filed: Jul. 11, 1988

[30] Foreign Application Priority Data

| Jul. 11, 1987 | [JP] | Japan | 62-173491 |
| Nov. 5, 1987 | [JP] | Japan | 62-280210 |
| Feb. 2, 1988 | [JP] | Japan | 63-23557 |
| Feb. 2, 1988 | [JP] | Japan | 63-23558 |
| Mar. 1, 1988 | [JP] | Japan | 63-48341 |

[51] Int. Cl.$^4$ ............................ H01M 10/48
[52] U.S. Cl. ............................ 429/91
[58] Field of Search ............................ 429/91

[56] References Cited

U.S. PATENT DOCUMENTS

| 1,012,298 | 12/1911 | Tormin | 429/91 |
| 1,699,633 | 1/1929 | Sears | 429/91 |
| 1,777,436 | 10/1930 | Holland | 429/91 |
| 1,865,250 | 6/1932 | Haungs | 429/91 |
| 1,956,984 | 5/1934 | Dunzweiler et al. | 429/91 |
| 2,054,691 | 9/1936 | Browne . | |
| 2,072,553 | 3/1937 | Graves et al. | 429/91 |
| 3,340,736 | 9/1967 | Suematsu | 429/91 |

FOREIGN PATENT DOCUMENTS

| 0003814 | 2/1905 | United Kingdom | 429/91 |
| 0302784 | 12/1929 | United Kingdom | 429/91 |
| 410935 | 6/1934 | United Kingdom . | |
| 598414 | 3/1948 | United Kingdom . | |

Primary Examiner—Donald L. Walton
Attorney, Agent, or Firm—W. G. Fasse; D. H. Kane, Jr

[57] ABSTRACT

A battery casing for containing an electrolytic is equipped with a window (6) through which the interior of the casing (1) can be seen. An indicating device (9) for providing indications which differ according to changes in the electrolyte conditions' is installed inside the casing for viewing through the window so that such electrolyte conditions as the amount and specific gravity of the electrolyte (44) can be indicated. The indicating device has a frame member (10) separate from the casing and a float (11) supported by the frame member whereby the float can move vertically in response to a change in the electrolyte conditions. The indicating device is installed with the frame member extending along the inner surface of the window-equipped lateral wall of the casing in such a manner the the float can be seen from the outside through the window. A joining mechanism (20-23, and 36, 37: 153 and 154) is used for installing the frame member from the above in the casing. In order to prevent bubbles produced in the electrolyte from adhering to the float, an bubble preventing plate (143) may be installed to cover the float.

28 Claims, 27 Drawing Sheets

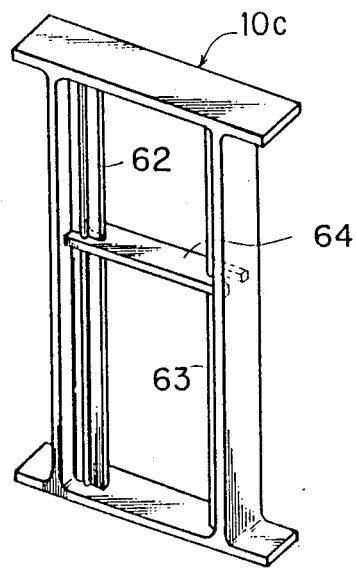
FIG. 11
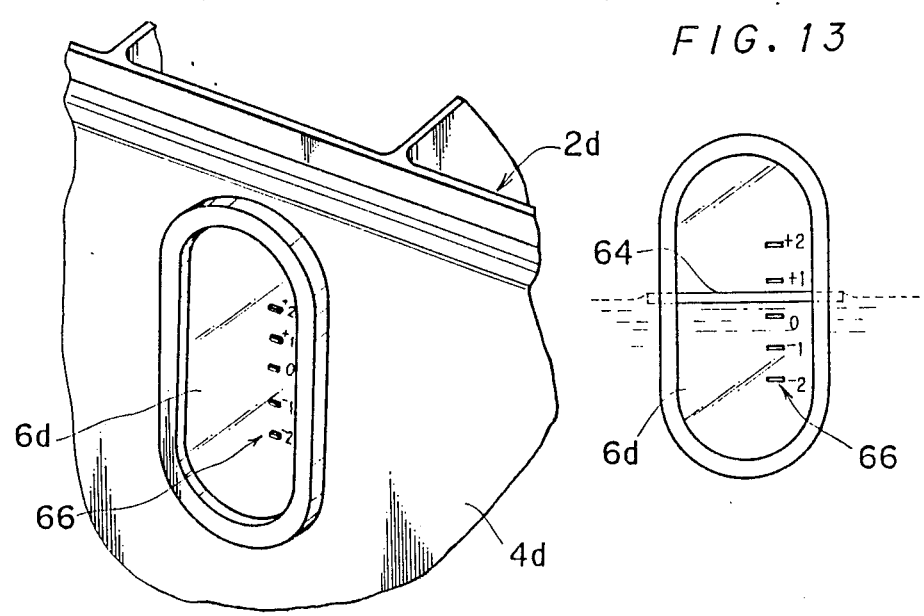
FIG. 12
FIG. 13

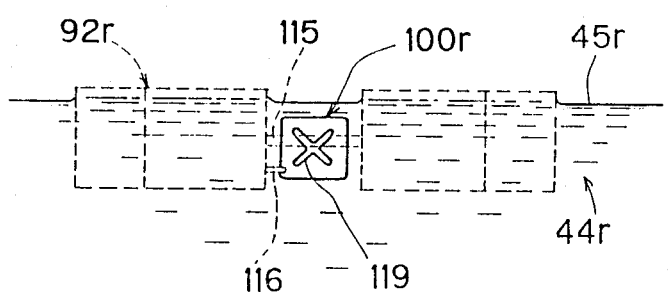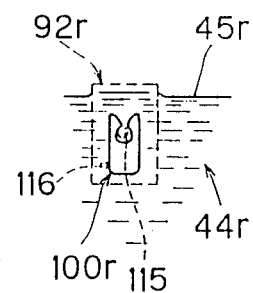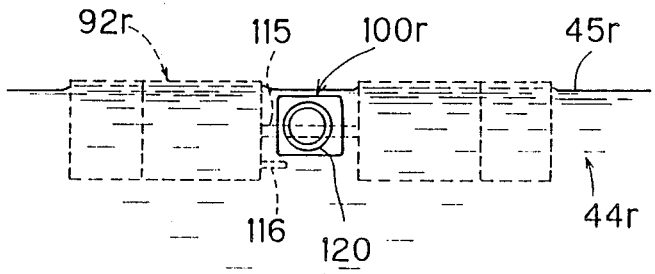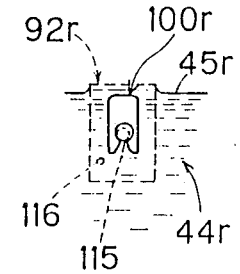

FIG. 47
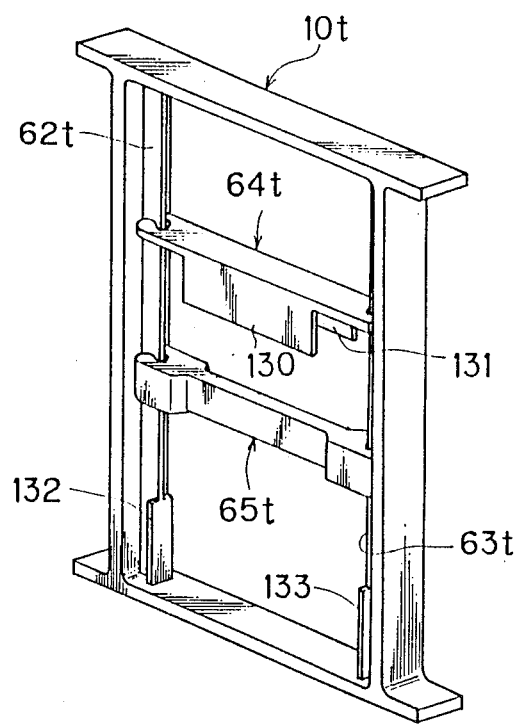
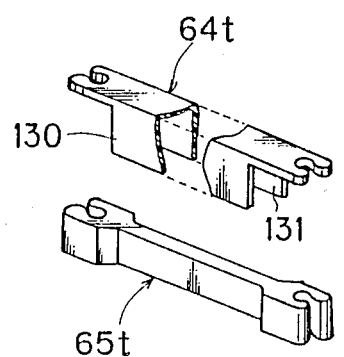
FIG. 48

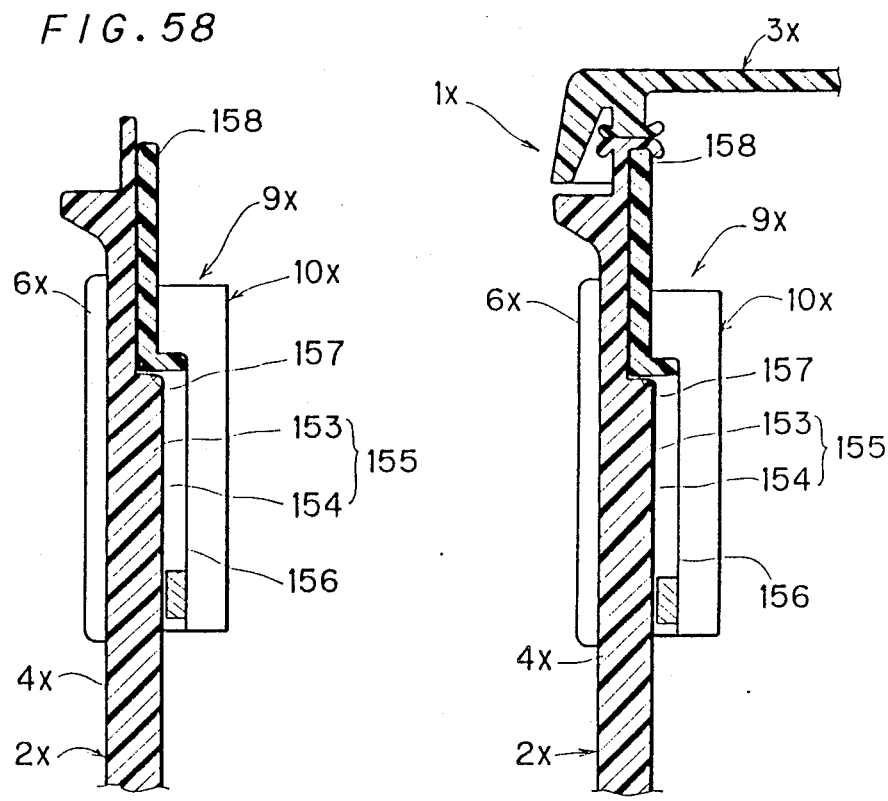

STORAGE BATTERY WITH INDICATING DEVICE

FIELD OF THE INVENTION

This invention relates to a storage battery and particularly to a storage battery having an indicating device for indicating the electrolyte conditions, such as the amount and specific gravity of the electrolyte contained in the battery casing.

BACKGROUND INFORMATION

For example, a lead storage battery has sulfuric acid stored therein as an electrolyte, and since the amount of such electrolyte has an important bearing on the performance of the storage battery and on the leakage of the electrolyte, it is necessary to keep the amount of the electrolyte under control so that its level in the battery casing is always in a given range. On the other hand, to monitor the charged condition, it is known to measure the specific gravity of the electrolyte.

One procedure for making it possible to monitor the electrolyte conditions, such as amount or specific gravity, from the outside, is to form a window in the lateral wall of the casing through which the interior of the casing can be seen, see for example, Japanese Utility Model Publication No. 233/1963. The simplest way to monitor the electrolyte surface level in the casing would be to make it possible to see the surface of the electrolyte directly through such window. In the case the electrolyte surface level is to be shown directly through the window, however, it is impossible to give a clear indication since the electrolyte is almost colorless and transparent.

Thus, it would be contemplated to use a float which is capable of always floating on the surface of the electrolyte and to give a vivid color to said float so that the float can be seen through the window instead of enabling the electrolyte surface to be seen directly.

On the other hand, in the case where the specific gravity of the electrolyte is to be indicated, generally, a float is used which floats or sinks, depending upon a change in the specific gravity of the electrolyte.

Arranging an indicating device using a float within a window formed in the lateral wall of the battery casing in order to indicate changes in the electrolyte conditions, however, raises technical problems in the manufacture of storage batteries.

That is, in the assembling process of storage batteries, there is included without fail the step of inserting an electrode plate assembly into the casing. In this case, since the electrode plate assembly is a relatively heavy object, it is more advantageous if a lesser number of operating steps are involved after the insertion of the electrode plate assembly into the casing. The reason is that the total weight of the casing and plate assembly makes moving the casing more difficult, whereby the manufacturing costs are increased. Therefore, it is desirable, if possible, that after the casing has been prepared, the indicating device as described above can be incorporated into the casing prior to the insertion of the electrode plate assembly.

In reality, however, it is impossible to incorporate an indicating device into the casing prior to the insertion of the electrode plate assembly, because the only space in the casing where such indicating device can be built-in is above the electrode plate assembly. Further, particularly in order to indicate the amount of the electrolyte, an indicating device is not allowed to be positioned beside or below the electrode plate assembly since the electrolyte surface level must be above the top level of the electrode plate assembly. However, in the case where such indicating device is installed on the inner side of the lateral wall of the casing, such indicating device has a shape which projects more or less from the inner surface of the lateral casing wall. Thus, if the indicating device were incorporated into the casing prior to the installation of the plates, this would form a hindrance to the insertion of the electrode plate assembly into the casing. For this reason, the sequence of assembling process must be such that the indicating device is incorporated into the electrolytic vessel subsequently to the insertion of the electrode plate assembly. Hence, some compromise must be made with regard to the manufacturing cost.

In addition, although there is some space left above the electrode plate assembly in the casing for installing the indicating device, as described above, the size of that space is rather limited. Therefore, the indicating device itself must be reduced in size. However, if the indicating device is so reduced in size, it becomes inconvenient to handle and the operation of assembling some parts included in the indicating device by using the casing as a base during the assembling process of the storage battery, is not preferable as it lowers the efficiency of production of storage batteries.

Therefore, if the operation of assembling the indicating device into the casing must be preceded by the insertion of the electrode plate assembly, it is at least desired that the operation of assembling the indicating device be simplified.

SUMMARY OF THE INVENTION

Accordingly, it is an object of the invention to provide a storage battery having an indicating device constructed so that it can be easily incorporated into the battery casing.

This invention is directed to a storage battery wherein a window through which the interior of the battery casing can be seen, is formed in a lateral casing wall of the storage battery. Inside the window there is installed an indicating device for indicating changes in the electrolyte conditions, and to solve the technical problems described above, the invention is characterized by employing the following arrangement or features.

That is, said indicating device comprises:
a frame member separate form said battery casing, and
a float held by said frame member so that the float is vertically movable in response to a change in said electrolyte conditions,
said indicating device being attached to extend along the inner surface of said lateral wall of said casing for viewing through said window.

In this invention, in the step of assembling the indicating device into the casing, the indicating device itself can be handled as an integral body, although the indicating device is a separate body with respect to the casing.

Thus, according to the invention, the battery construction is provided with an indicating device which is prepared as a body separate from the casing and which itself can be integrally handled, and since such indicating device is attached to the casing through a frame member, the indicating device can be incorporated into the casing without so much decreasing the operability after the electrode plate assembly has been inserted during the assembling process of the storage battery. Therefore, a storage battery having an indicating device according to the invention can be efficiently obtained by adding only one step of incorporating the indicating device in the conventional storage battery assembling process.

Further, since all of the components of the indicating device can be held by the frame member, the indicating device can be easily handled through the frame member even if the indicating device is reduced in size. This leads to the advantage that even if the indicating device is reduced in size so as to be disposed in the limited space in the casing, the operation of incorporating the indicating device is not complicated.

Further, the indicating device itself will not be assembled in the assembling process of storage batteries, but will be produced separately from the production of storage batteries, whereby incorporating the indicating is simplified, so that there is no possibility that the efficiency of production of storage batteries will decrease owing to the assembling operation of the indicating device itself.

In a preferred embodiment of the invention, the float is positioned in a container having a bubble preventing plate at least locally therein which allows passage of the electrolyte but which prevents passage of bubbles produced in the electrolyte. Bubbles produced in the electrolyte are prevented from adhering to the float and hence the latter is protected against bubbles which are liable to impede the proper movement of the float. Therefore, the float can operate with a high reliability.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a perspective view of an indicating device 9d having the function of indicating the amount of an electrolyte;

FIG. 12 is a perspective view showing a modification of a window 6d formed in a casing body 2d having the indicating device 9d of FIG. 11 incorporated therein;

FIG. 13 is a front view diagrammatically showing the positional relationship between a window 6d shown in FIG. 12 and a float 64 shown in FIG. 11;

FIGS. 40 to 43 are front or side views for explaining how the first and second floats 92r and 100r shown in FIG. 37 operate;

FIG. 47 is a perspective view showing an indicating device 9t used in another embodiment of the invention;

FIG. 48 is a perspective view showing an electrolyte surface level indicating float 64t and a specific gravity indicating float 65t included in the indicating device 9t shown in FIG. 47;

FIG. 58 is an enlarged sectional view taken along the line (58)—(58) in FIG. 56;

FIG. 59 is a sectional view corresponding to FIG. 58 and showing a cover 3x joined to the casing body 2x;

DESCRIPTION OF THE PREFERRED EMBODIMENTS

Figure 1:
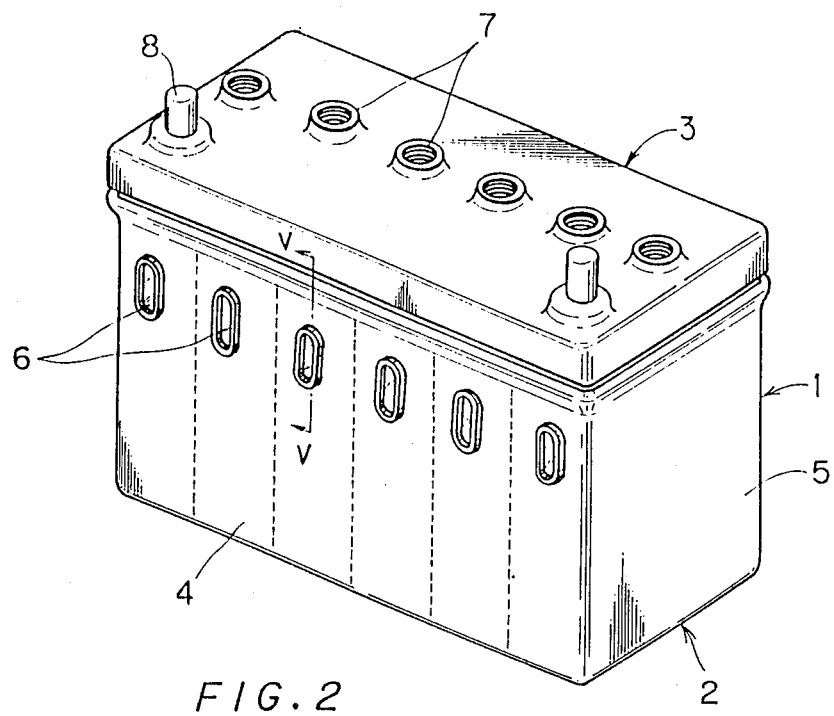
FIG. 1 is a perspective view showing the external appearance of a storage battery according to an embodiment of this invention.

As shown in FIG. 1, this storage battery has a battery casing including a casing body 2 and a cover 3 fixed to the body to close its upper opening. The casing 1 has four lateral walls of which walls 4 and 5 are shown in FIG. 1. The casing 1 is divided into, e.g., 6 cells, as shown in dotted lines, and windows 6 are formed for the respective cells. The cover 3 is formed with, e.g., six electrolyte ports 7 for filling the casing with electrolyte or adding water to the proper level. Normally, these ports 7 are closed by port plugs not shown. Further, pole columns 8 extend through the cover 3.

The casing body 2 and cover 3 are made by injection molding using, e.g., an olefin type resin. Particularly, it is preferable to form the body 2 and cover 3 of a polypropylene type copolymer selected from olefin type resins. Such materials are highly shock-resistant and relatively opaque which makes these materials suitable for the purpose.

The windows 6 are preferably formed by so-called secondary injection molding of a resin in such a manner as to fill holes formed at the corresponding locations on the electrolytic vessel body 2. The material forming the windows is preferably of the same olefin type resin. In the case where the electrolytic vessel body 2 and windows 6 are made from an olefin type resin, the strength for bonding them together is very high, providing a high reliability in preventing leakage of the electrolyte. In addition, the windows 6 are formed in such a manner that the interior of the casing 1 can be seen therethrough. To this end, the windows 6 are formed to have thinner walls than the walls of the casing body 2, or the windows are formed of a material which is more transparent than the casing. For example, in the case where the body 2 is formed of a polypropylene type copolymer, as described above, the windows 6 are preferably formed of a homopolymer or random copolymer of polypropylene, because these polymers are more transparent than ordinary copolymers. Further, random copolymers can be said to be further preferable since they are also superior in shock resistance.

In addition, in forming windows 6 in the lateral wall 4 of the casing 1, other methods than the so-called secondary injection molding described above may be employed.

In the storage battery shown in FIG. 1, an indicating device for indicating changes in the electrolyte conditions, is installed inside each windows 6 so that the electrolyte conditions in the interior can be displayed through the window 6. An example of such indicating device is shown in FIG. 2 in a perspective view.

Figure 2:
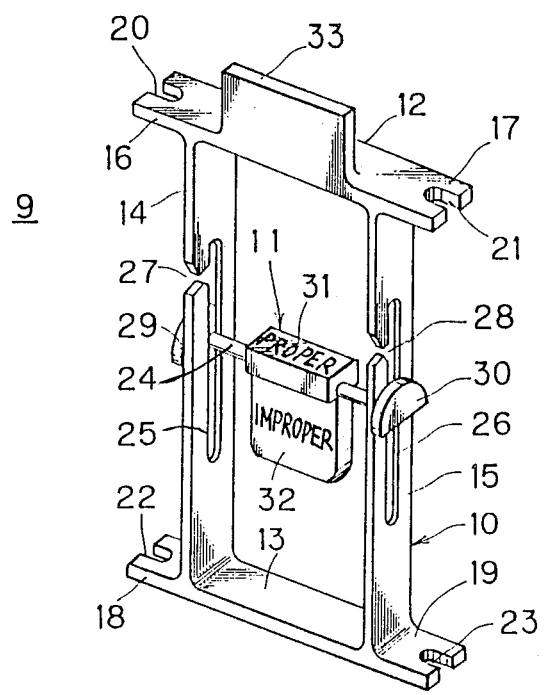
FIG. 2 is a perspective view showing an indicating device 9 applied to the storage battery shown in FIG. 1.

Referring to FIG. 2, the indicating device 9 is formed entirely of an acid-resistant material. The indicating device 9 has a frame member 10 and a float 11 held by the frame member 10. The frame member 10 is in the form of a quadrangle comprising opposed upper and lower sides 12 and 13 and opposed left and right sides 14 and 15. The upper and lower sides 12 and 13 have attaching portions 16, 17, 18 and 19 extending leftward and rightward from the left and right sides 14 and 15, and the end surfaces of the attaching portions 16, 17 18 and 19 corresponding to the left and right outer lateral surfaces of said frame member 10, are formed with slots 20, 21, 22 and 23.

The float 11 is constructed to move in response to changes in both the surface level and the specific gravity of the electrolyte in a casing. First, the float 11 has a horizontally extending shaft 24 which is received at its opposite ends by vertically extending elongated openings 25 and 26 formed in the left and right sides 14 and 15 of the frame member 10. The shaft 24 is rotatable around its own axis and is translatable or displaceable in the direction in which the elongated openings 25 and 26 extend. The elongated openings 25 and 26 are formed with slots 27 and 28 each at one location on the circumference of each of the elongated openings 25 and 26. These slots facilitate incorporating the float 11 into the frame member 10. Once the float 11 has been incorporated into the frame member 10, the slots do not perform any particular function.

At the opposite ends of the shaft 24 and beyond the outer portions of the left and right sides 14 and 15 of the frame member 10, rotating movement range limiting members 29 and 30 are fixedly installed on the shaft 24. The rotating movement range limiting members 29 and 30 prevent the float 11 from slipping off the frame member 10 and also act literally as means for limiting the rotating movement range of the float 11, as will be understood from the operation of the float 11 to be described below with reference to FIGS. 4 to 7.

Substantially, at the middle of the shaft 24, a first indicating member 31 is fixedly installed on the shaft 24. The first indicating member 31 has a second indicating member 32 connected thereto. The first indicating member 31 has, e.g., the letters "PROPER" presented thereon and the second indicating member has the letters "IMPROPER" presented thereon. Further, preferably each of the first and second indicating members 31 and 32 has a different color. Preferably these colors are fluorescent. The various parts of the float 11 including the first and second indicating members 31 and 32 are selected so that the operating modes shown in FIGS. 4 to 7 are made possible as will be described below with reference to FIGS. 4 to 7.

A vertical wall 33 is formed to project upwardly from the upper side 12 of the frame member 10.

Figure 3:
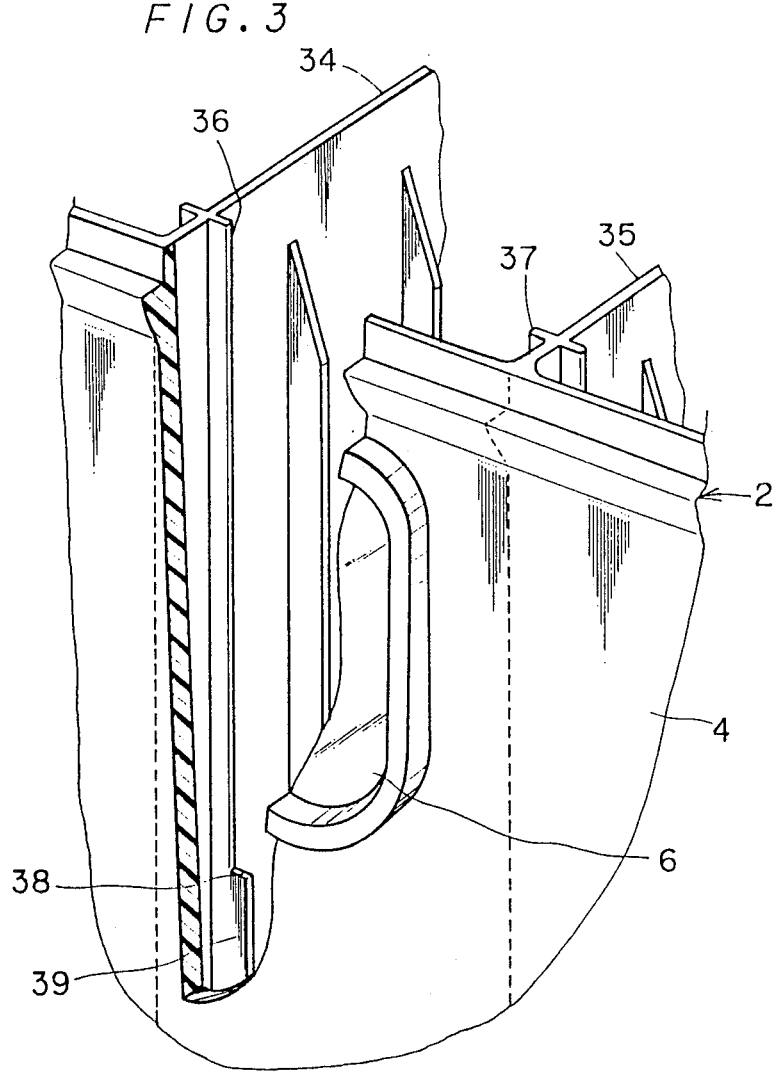
FIG. 3 is an enlarged perspective view showing a portion of battery casing body 2 illustrating a construction for incorporating an indicating device 9 shown in FIG. 2 into the casing.

FIG. 3 shows means for positioning the indicating device 9 described above.

Referring to FIG. 3, partition walls 34 and 35 for dividing the interior of the casing body 2 into cells, are shown. The distance between these partition walls 34 and 35 corresponds to the length of the upper and lower sides 12 and 13 of the frame member 10 provided in the indicating device 9. Therefore, the frame member 10 is held between these opposed partition walls 34 and 35 while abutting against them, whereby it is positioned widthwise thereof. That is, the partition walls 34 and 35 form opposed positioning walls which rise from the inner surface of the lateral wall 4 provided with the window 6 and which vertically extend to position the window 6 therebetween. In addition, in the remotest cell, such positioning wall is provided by another lateral wall of the casing 1, e.g., the lateral wall 5 (FIG. 1). The partition walls 34 and 35 are formed with vertically extending guide ribs 36 and 37, respectively, adapted to fit in the slots 20 to 23 shown in FIG. 2. Therefore, by incorporating the indicating device into the body 2, the guide rib 36 is received in the slots 20 and 22 while the guide rib 37 is received in the slots 21 and 23. In this state, the indicating device 9 is inserted from above. In this manner, the frame member 10 is positioned with respect to the direction to cross the lateral wall 4 at right angles.

As shown in FIG. 3 concerning the guide rib 36, a positioning rib 39 extending on the same line as the guide rib 36 to define an upwardly directed step or stop surface 38 is formed on the lower end of the guide rib 36. Though not shown in FIG. 3 but shown in FIGS. 4 and 6 in dotted lines, for the guide rib 37, a step surface 40 and a positioning rib 41 are similarly formed. In such arrangement, the lower surface of the frame member 10, more particularly the lower surface of the lower side 13 abuts against the step surfaces 38 and 40, whereby the frame member 10 is fixed against a downward displacement. In addition, to achieve such positioning, only one of the step surface 38 or 40 is sufficient; therefore, one of the positioning ribs 39 and 41 may be formed so that it extends vertically with the same cross-sectional shape as the guide rib 39 or 41.

In addition, the positioning ribs 39 and 41 have been formed so that they have substantially the same width as the guide ribs 6 while making their projecting heights greater to thereby form the step surfaces 38 and 40. However, reversely, while making the projecting heights equal, the width may be increased to thereby form step surfaces.

Figure 4:
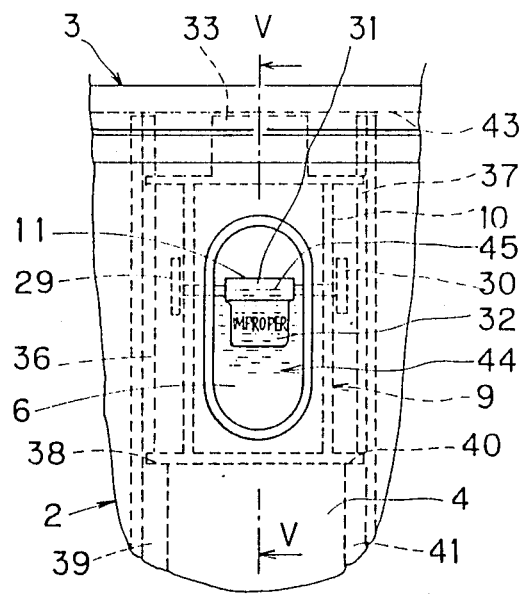
FIG. 4 to 7 are views for explaining how the indicating device 9 shown in FIG. 2 operates.
Figure 5:
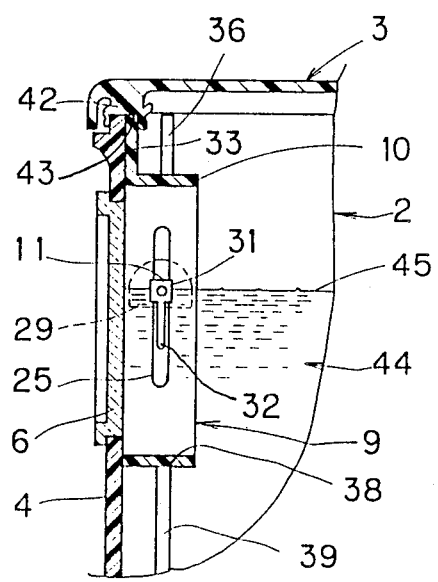
Figure 6:
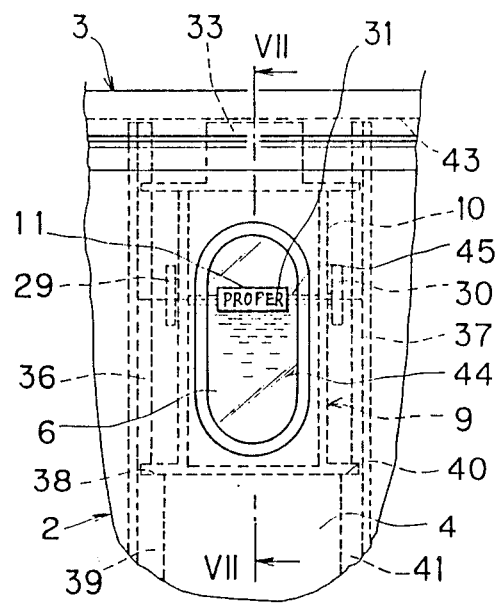
Figure 7:
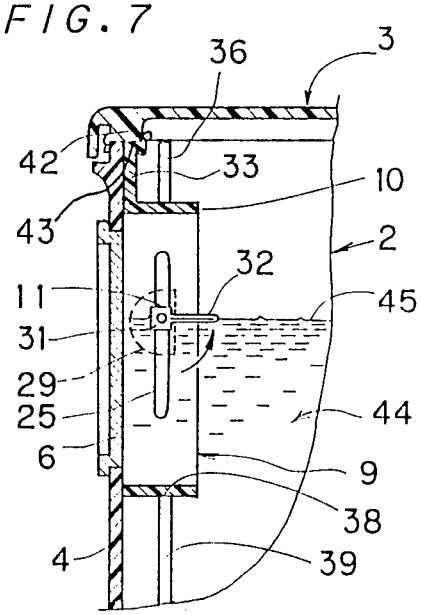

A sectional view taken along the line V—V in FIGS. 1 and 4 is shown in FIG. 5. Further, a sectional view taken along the line VII—VII in FIG. 6 is shown in FIG. 7. In FIGS. 5 and 7, the cover 3 is fixed to the body 2 as by thermal adhesion, in which case it is usual for the thickness of the lateral portion 42 of the cover 3 to be greater than that of the lateral wall 4 of the body 2. Therefore, the lateral portion 42 of the cover 3 extends from the inner surface of the lateral wall 4 of the body 2 to the interior. The lower surface 43 of the lateral portion 42 of the cover 3 acts to position the indicating device 9. That is, the upper end surface of the vertical wall 33 of the frame member 10 abuts against the lower surface 43 of the cover 3, whereby the upward displacement of the frame member 10 is inhibited. In addition, since the vertical wall 33 is formed to rise upward from the main portion of the frame member 10, the heat generated during the thermal adhesion process between the body 2 and the cover 3 is prevented from adversely affecting, e.g., deforming, the frame member 10.

The manner of operation of the indicating device 9 will now be described with reference to FIGS. 4 to 7.

First, FIGS. 4 and 5 show the state in which the specific gravity of the electrolyte is insufficient, demanding to charge the storage battery. In this state, the second indicating member 32 of the float 11 hangs down and gives the indication "IMPROPER" through the window 6, as shown in FIG. 4. While assuming this state, the float 11 is capable of floating on the surface level 45 of the electrolyte. Therefore, the float 11 is vertically displaced in response to any change in the electrolyte surface level 45.

If electric charging is effected to remove the insufficient specific gravity state shown in FIGS. 4 and 5, the specific gravity of the electrolyte 44 increases, causing the second indicating member 32 to rise causing a rotating movement of the second indicating member 32 around the axis of the shaft 24. The direction of this rotating movement of the second indicating member 32 is limited to the counterclockwise direction as seen in FIG. 5 by the turning movement range limiting members 29 and 30 abutting against the inner surface of the lateral wall 4 of the body 2. Therefore, when the specific gravity of the electrolyte 44 becomes proper, the posture of the float 11 as shown in FIGS. 6 and 7 is obtained. That is, the second indicating member 32 extends substantially along the surface level 45 of the electrolyte 44, allowing the indication "PROPER" provided on the first indicating member 31 to be seen through the window 6. Even in this state, the float 11 can be displaced vertically in response to the displacement of the electrolyte surface level 45. In addition, lines or graduations (not shown) representing the upper and lower levels may be provided in the window 6.

Figure 8:
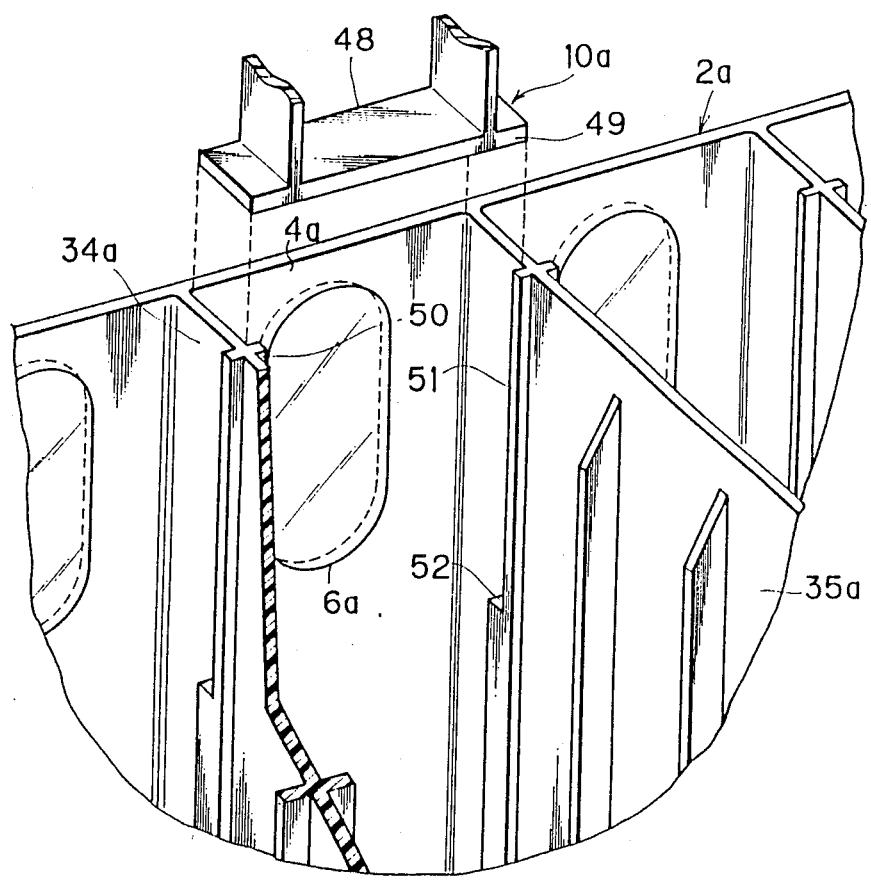
FIG. 8 is a perspective view for explaining another example of the manner of incorporating the frame member 10a of the indicating device into the casing.

In FIG. 8, there is shown another example of a construction for positioning the frame member of the indicating device. In FIG. 8, a portion of the frame member 10a of the indicating device is illustrated. This frame member 10a is not provided with slots 20 to 27 which are found in the above embodiment. The frame member 10a is provided with a front surface 48 and rear surface 49 defining the widthwise dimension thereof. The partition walls 34a and 35a which form positioning walls inside the body 2a are formed with vertically extending guide ribs 50 and 51 at positions spaced a distance corresponding to the thickness of the frame member 10a from the inner surface of the lateral wall 4a formed with the window 6a. Therefore, the frame member 10a which defines a vertical plane, is positioned so that said vertical plane extends in parallel to the lateral wall 4a whereby the front surface 48 contacts the inner surface of the lateral wall 4a and its rear surface 49 contacts the guide ribs 50 and 51.

Further, in FIG. 8, as shown with respect to the guide rib 51, the lower end of the guide rib 51 is formed with an upwardly directed positioning surface 52. This positioning surface 52 stops the frame member 10a against a downward displacement by supporting its lower surface. A similar positioning surface may be provided in connection with the other guide rib 50.

However, the positioning surface may be located without regard to the guide ribs 50 and 51, for example, on the inner surface of the lateral wall 4a.

In FIGS. 9 to 48, various modifications of indicating devices are shown. The indicating devices shown in these figures are provided with a frame member not having a shape corresponding to the slots 20 to 23 as in the frame member 10a shown in FIG. 8. However, in these modifications also, though not shown, they may have a frame member with slots 20 to 23 arranged so that they are positioned by guide ribs 36 and 37 as shown in FIG. 3.

Figure 9:
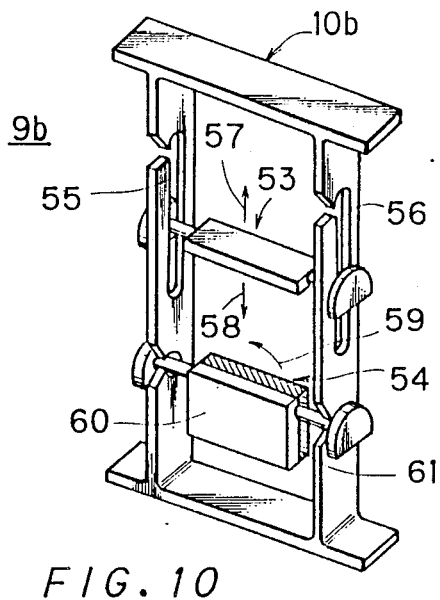
FIGS. 9 and 10 are perspective views each showing another example of an indicating device having the function of indicating both the amount or level and the specific gravity of an electrolyte.

An indicating device 9b shown in FIG. 9, as the indicating device 9 in the embodiment described above, indicates both the amount or level and the specific gravity of the electrolyte. The indicating device 9b has a frame member 10b and first and second floats 53 and 54 held by said frame member 10b.

The first float 53 is constructed with a specific gravity such that it always floats on the electrolyte surface, thus solely performing the function of indicating the amount or level of the electrolyte in the casing. The frame member 10b is formed with vertically extending elongated openings 55 and 56, and guided by these elongated openings 55 and 56, the first float 53 travels vertically, as shown by arrows 57 and 58. Such vertical travel or movement takes place in response to changes in the electrolyte surface level in the casing.

On the other hand, the second float 54 is disposed below the first float 53 and solely indicates the specific gravity of the electrolyte. The second float 54 is rotatably attached to the frame member 10b, as shown by arrow 59. The second float 54 has first and second indicating members 60 and 61 which are differently colored. The state shown in FIG. 9 corresponds to an insufficient specific gravity state in which the first and second indicating members 60 and 61 hang down. When the specific gravity of the electrolyte becomes normal, the first and second indicating members 60 and 61 turn or rotate in the direction of arrow 59, thus standing up. Therefore, depending upon a change in the specific gravity of the electrolyte, the first or second indicating member 60 or 61 will be presented through the window (not shown), whereby it is possible to judge whether or not the specific gravity is insufficient.

Figure 10:
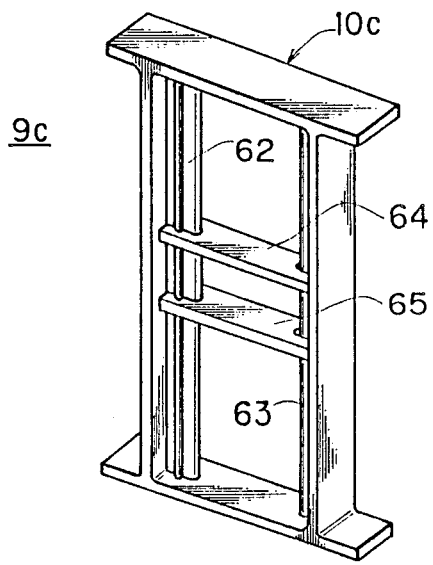

An indicating device 9c shown in FIG. 10 also performs the function of indicating both the amount or level and the specific gravity of the electrolyte. The frame member 10c of the indicating device 9c is provided with a pair of vertically extending guide rails 62 and 63. First and second floats 64 and 65 are supported for vertical translation by these guide rails 62 and 63.

The first float 64, which serves to solely indicate the amount of the electrolyte, is made of a material having a specific gravity such that it always floats on the electrolyte surface.

On the other hand, the second float 65 is disposed below the first float 64 and serves to solely indicate the specific gravity of the electrolyte. In addition, to make it easier to see the indication, the second float 65 has a color different from that of the first float 64.

In the indicating device 9c shown in FIG. 10, if the specific gravity of the electrolyte is proper, the second float 65 moves up into contact with the first float 64. On the other hand, if the specific gravity of the electrolyte is insufficient, the second float 65 separates from the first float 64 and sinks down.

An indicating device 9d shown in FIG. 11 corresponds to the indicating device 9c shown in FIG. 10 minus the second float 65. That is, the indicating device 9d only indicates the amount of the electrolyte. Since the indicating device 9d has a close bearing on the indicating device 9c shown in FIG. 10, the corresponding parts have the same reference numerals and a repetitive description thereof is omitted.

In FIG. 12, a portion of a body 2d is shown on an enlarged scale. This body 2d is intended to receive the indicating device 9d shown in FIG. 11. A window 6d formed in the lateral wall 4d of the body 2d is formed with graduations 66 in an embossed pattern. In the case where the window 6d is formed by secondary molding as described above, such graduations 66 can be easily obtained by applying a pattern corresponding to the graduations 66 to a mold for the molding.

The graduations 66 described above, as illustrated in FIG. 13, are capable of indicating the position of the float 64 more definitely. If such graduations 66 are provided between the upper and lower limits of the electrolyte surface, the presence of the float 64 at a position outside the graduations 66 clearly indicates that the amount or level of the electrolyte is not proper.

In addition, the window 6d having the graduations 66 may be applied to other indicating devices.

Figure 14:
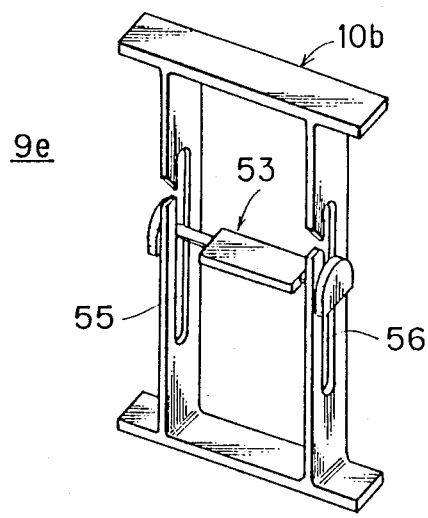
FIGS. 14, 15, 16 and 17 are perspective views each showing another example of an indicating device for indicating the amount or level of an electrolyte in a casing.

An indicating device 9e shown in FIG. 14 corresponds to the indicating device 9b shown in FIG. 14 minus the second float 54. Therefore, the indicating device 9e is used solely to indicate the amount or level of the electrolyte. In addition, in FIG. 14, the parts corresponding to those shown in FIG. 9 have the same reference numerals and a repetitive description thereof is omitted.

Figure 15:
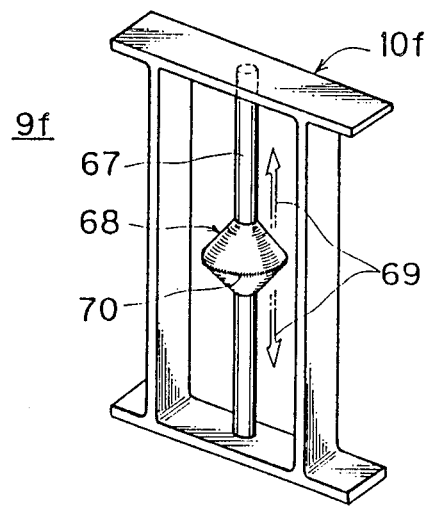

An indicating device 9f shown in FIG. 15 has a vertically extending guide bar 67 substantially at the middle of its frame member 10f. The guide bar 68 has a float 68 vertically displaceably mounted thereon as shown by arrows 69. The float 68 has a specific gravity such that it always floats on the electrolyte surface, thereby solely indicating the amount or level of the electrolyte in the casing. The float 68 has the form of two frusto-cones put together to face in mutually opposite directions and preferably formed at the junction with a colored region 70 having a suitable color.

Figure 16:
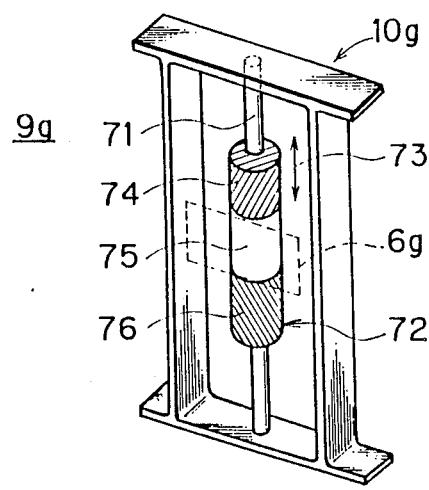

A frame member 10g included in an indicating device 9g shown in FIG. 16 is provided with a vertically extending guide bar 71 substantially at the middle. The guide bar 71 has a float 72 vertically displaceably mounted thereon as shown by arrow 73. The float 72 is in the form of a cylinder having first, second, and third differently colored regions 74, 75, and 76 formed on the peripheral surface thereof. The float 72 has a specific gravity such that it always floats on the electrolyte surface. As shown in broken lines, the window 6g preferably has a reduced vertical dimension, so that one or another of the colored regions 74, 75, or 76 of the float 72 comes into view in response to the a change in the electrolyte surface level to give a clear indication.

Figure 17:
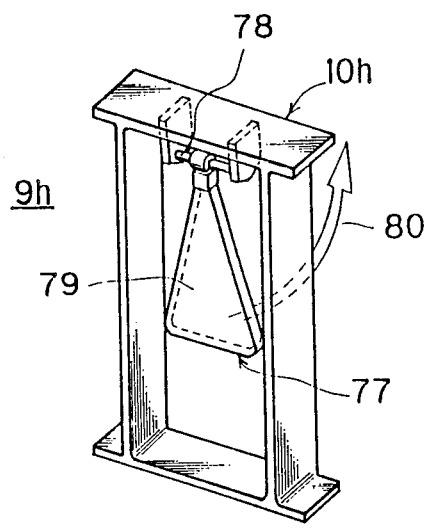

An indicating device 9h shown in FIG. 17 has a float 77 rotatably held in a frame member 10h. The float 71 is rotatably supported at its upper end on a horizontal shaft 78 held by the frame member 10h. The front surface 79 of the float 77 in FIG. 17 is colored red, for example. The float 77 has a specific gravity such that in the electrolyte it always turns in the direction to float as shown by arrow 80. Therefore, only when the amount of the electrolyte is insufficient, the surface 79 of the float 77 comes into view through a window not shown.

Figure 18:
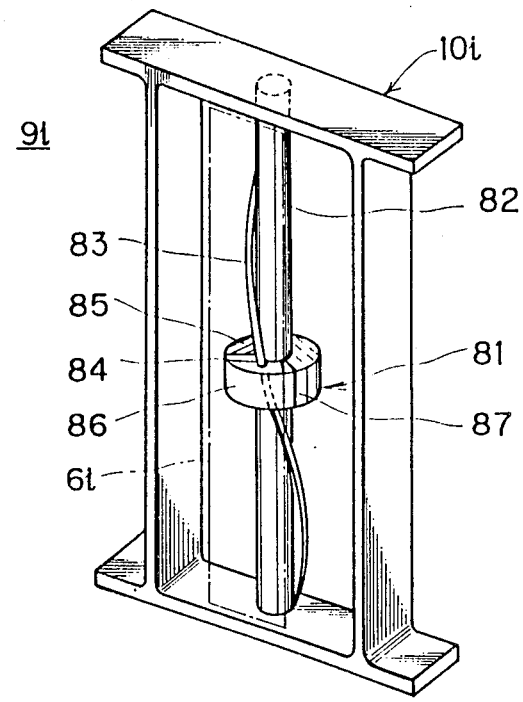
FIG. 18 is a perspective view showing another example of an indicating device for indicating the amount or level of an electrolyte in a casing.

An indicating device 9i shown in FIG. 18 has a float 81 adapted to move vertically and to turn horizontally at the same time. That is, the frame member 10i has a vertically extending cylindrical guide bar 82 substantially at the middle. The periperal surface of the guide bar 82 has a spirally extending rib 83. On the other hand, the float 81 is supported for vertical displacement on the guide bar 82 and is provided with a groove 84 for receiving the rib 83. Further, the float 81 has first, second, and third differently colored regions 85 through 87. In connection with this indicating device 9i, it is preferable, as shown in phantom lines, to apply a window 6i having a small transverse dimension and a sufficient vertical dimension to cover the range of vertical movement of the float 81.

Figure 19:
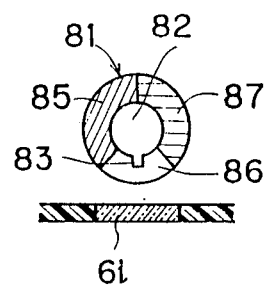
FIGS. 19, 20 and 21 are diagrammatic views showing the relation between the movement of a float 81 and a window 61 shown in FIG. 18.
Figure 20:
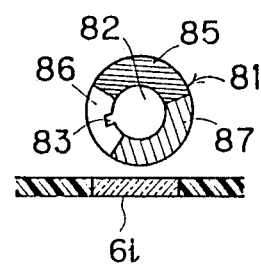

In FIGS. 19 to 20, the operation of the indicating device 9i shown in FIG. 18 is diagrammatically shown.

FIG. 19 shows a case where the amount or level of the electrolyte is normal and the second colored region 86 is visible through the window 6.

The state shown in FIG. 20 shows the float 81 coming into the vicinity of the upper limit of the amount or level of the electrolyte. In this state, the float 81 is displaced upwardly and is guided by the spiral rib 83 to turn horizontally to make the third colored region 87 visible through the window 6.

Figure 21:
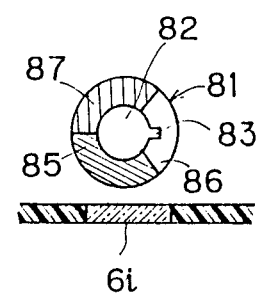

FIG. 21 shows the amount or level of the electrolyte coming into the vicinity of the lower limit. In this state, the float 81 is displaced downwardly and is guided by the spiral rib 83 to turn horizontally to make the first colored region 85 visible through the window 6i.

Figure 22:
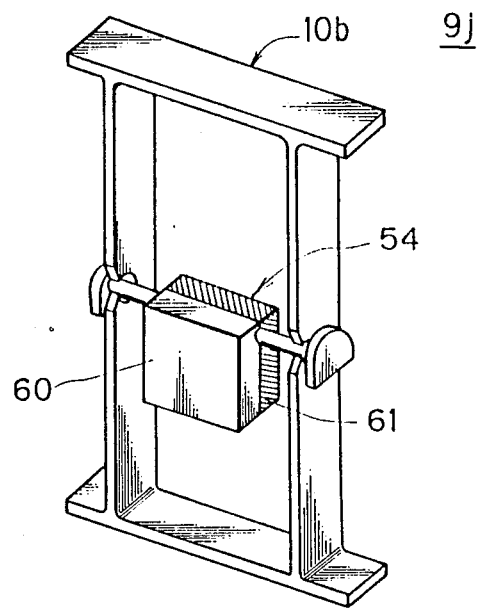
FIG. 22 is a perspective view showing another example of an indicating device for indicating the specific gravity of the electrolyte.

An indicating device 9j shown in FIG. 22 is intended to indicate only the specific gravity of the electrolyte. In addition, this indicating device corresponds to the indicating device 9b shown in FIG. 9 minus the first float 53 and the parts associated therewith. Therefore, in FIG. 22, the components corresponding to those shown in FIG. 9 have the same reference numerals and a repetitive description thereof is omitted.

Figure 23:
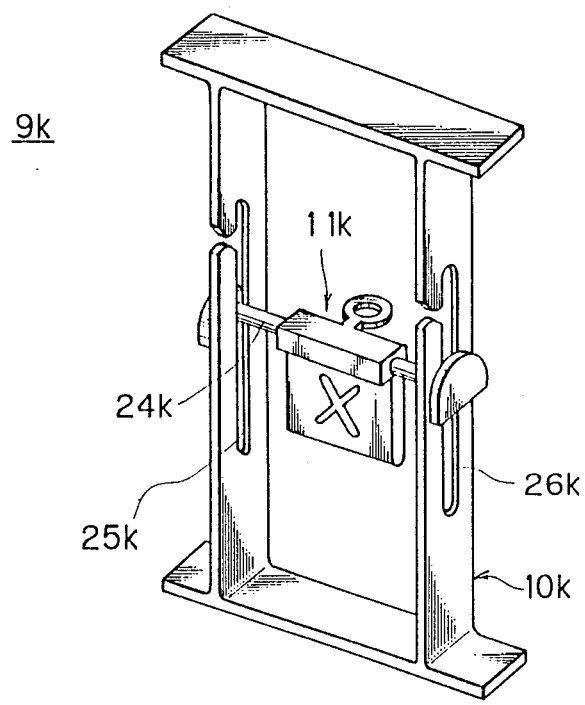
FIG. 23 is a perspective view showing another example of an indicating device for indicating both the amount or level and the specific gravity of an electrolyte in a casing.
Figure 24:
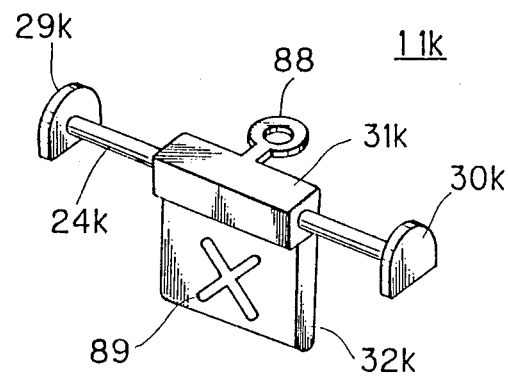
FIG. 24 is an enlarged perspective view singly showing a float 11k shown in FIG. 23.

An indicating device 9k shown in FIG. 23 is very similar to the indicating device 9 shown in FIG. 2 with respect to a float 11k and to a frame member 10k holding said float 11k.

The float 11k, like the float 11 of FIG. 2, has a shaft 24k received at its opposite ends in elongated openings 25k and 26k formed in the frame member 10k. The float 11k is shown alone in FIG. 24. At opposite ends of the shaft 24k, rotating movement range limiting members 29k and 30k are fixedly installed on the shaft 24k. These turning movement range limiting members 29k and 30k perform the same function as that of the turning movement range limiting members 29 and 30 in FIG. 2.

Further, in connection with the shaft 24k of the float 11k, there are first and second indicating members 31k and 32k as in the case of the float 11 of FIG. 2. In this embodiment, the first and second indicating members 31k and 32k have different indicator characters. That is, the first indicating member 31k has an indicator character 88 in the form of an "o" and the second indicating member 32k has an indicator character 89 in the form of an "x". The characters 88 and 89 may be differently colored: for example, green for the character 88 and red for the character 89.

The operation of the indicating device 9k shown in FIG. 23 will now be described with reference to FIGS. 25 to 28.

Figure 25:
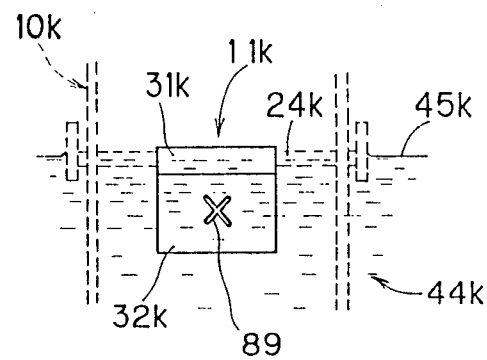
FIGS. 25 to 28 are front or side views for explaining how the float 11k operates.
Figure 26:
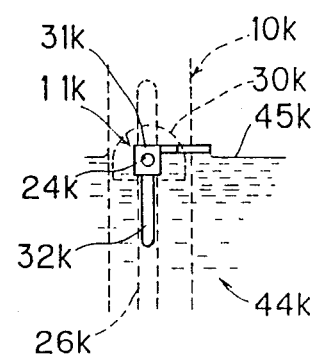

First, FIGS. 25 and 26 show the state in which the specific gravity of the electrolyte 44k is insufficient. In this state, the second indicating member 32k hangs down and the "x" indication 89 is visible through the window 6, FIG. 1. The "o" indicator 88 is not visible through the window 6 since it is hidden behind the first indicating member 31k. While assuming such a state, the float 11k is capable of floating on the surface 45k of the electrolyte 44k. Thus, the float moves vertically in response to any change in the electrolyte surface level 45k.

Figure 27:
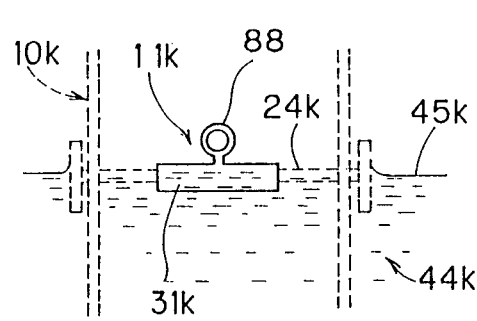
Figure 28:
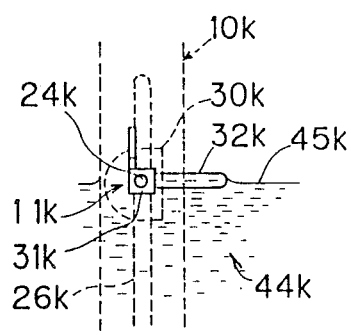

FIGS. 27 and 28 show the posture of the float 11 when the specific gravity of the electrolyte 44k is proper. In this state, the "o" indicator 88 stands up and is visible through the window 6, FIG. 1. The second indicating member 32k is hidden behind the first indicating member 31k and hence not visible. In this state also, the float 11k moves vertically in response to any change in the electrolyte surface level 45k.

Figure 29:
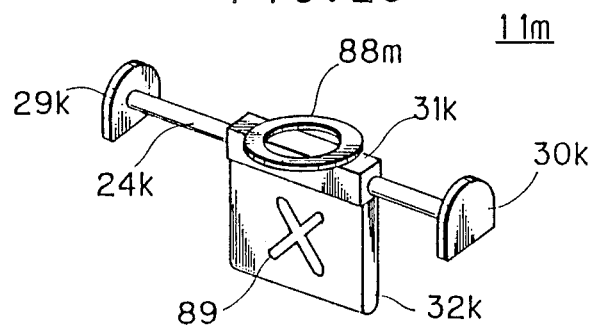
FIG. 29 is an enlarged perspective view of a float 11m used in place of the float 11k shown in FIG. 23.

In FIG. 29, a float 11m which can be used in place of the float 11k shown in FIG. 23, is shown alone in a perspective view. This float 11m is the same as the float 11k except that the "o" indicator 88m is formed on the first indicating member 31k. Therefore, the corresponding parts have the same reference characters used in the float 11k and a repetitive description is thereby omitted.

Figure 30:
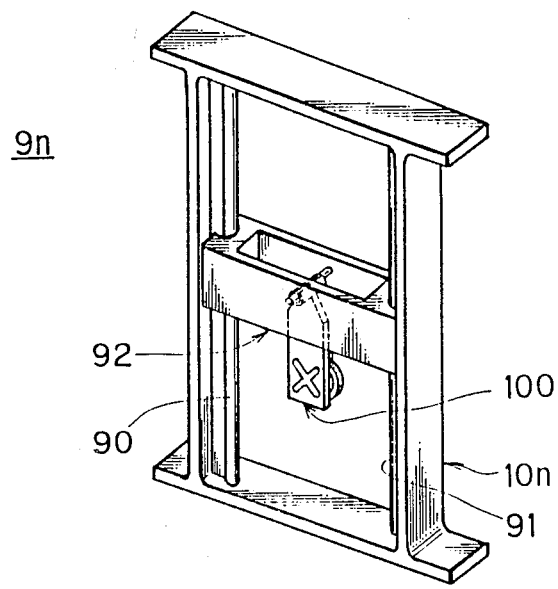
FIG. 30 is a perspective view showing another example of an indicating device for indicating both the amount or level and the specific gravity of an electrolyte in a casing.

The indicating device 9n shown in FIG. 30 is also constructed for indicating both the amount or level and the specific gravity of the electrolyte. The frame member 10n of the indicating device 9n is provided with a pair of vertically extending guide rails 90 and 91. A first float 92 is held at its opposite ends by these guide rails 90 and 91 so that it can move vertically. The first float 92 is intended solely to indicate the amount or level of the electrolyte and has a specific gravity such that it always floats on the electrolyte surface.

Figure 31:
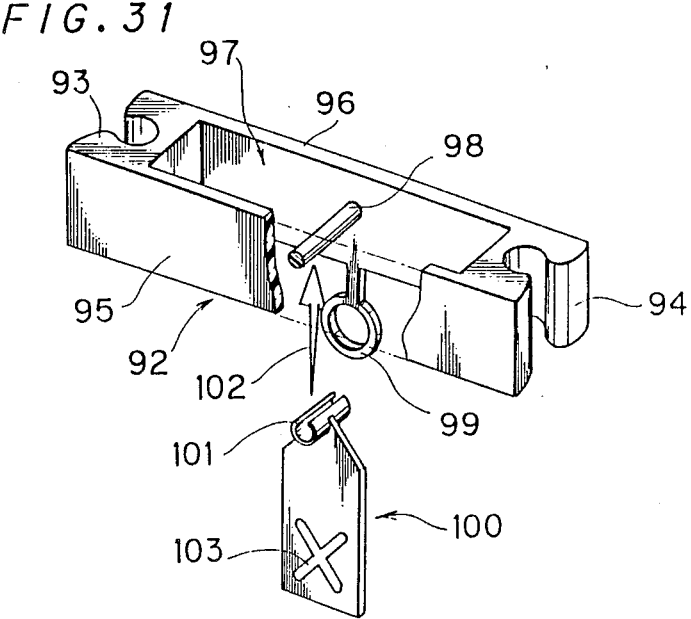
FIG. 31 is an enlarged perspective view showing, in an exploded fashion, a first float 92 and a second float 100 shown in FIG. 30.

The first float 92 is shown in FIG. 31 enlarged and partly broken away. The first float 92 is formed at its opposite ends with guide yokes 93 and 94 adapted to slidably fit on said guide rails 90 and 91, respectively. The first float 92 has opposed front and rear walls 95 and 96, and a space 97 vertically extending therethrough is defined between these front and rear walls 95 and 96. A shaft 98 extends across the space 97 to interconnect the front and rear walls 95 and 96. Further, an "o" indicator is formed to extend downwardly from the rear wall 96.

In this embodiment, a second float 100 is constructed to be held by said first float 92. The second float 100 is constructed to operate only in response to a change in the specific gravity of the electrolyte. The second float 100, therefore, is made of a resin having a specific gravity such that it floats when the specific gravity of the electrolyte is proper and sinks when the specific gravity of the electrolyte is not proper. The second float 100 is provided at its proximal end with a bearing 101 of C-shaped cross section. The bearing 101 receives the shaft 98 against the elasticity of the resin, as shown by arrow 102, whereby the second float 100 is held by the first float 92 so that it is turnable or rotatable around the axis of the shaft 98. The second float 100 has an "x" indicator 103 applied thereto.

The operation of the indicating device 9n shown in FIGS. 30 and 31 will now be described with reference to FIGS. 32 and 33.

Figure 32:
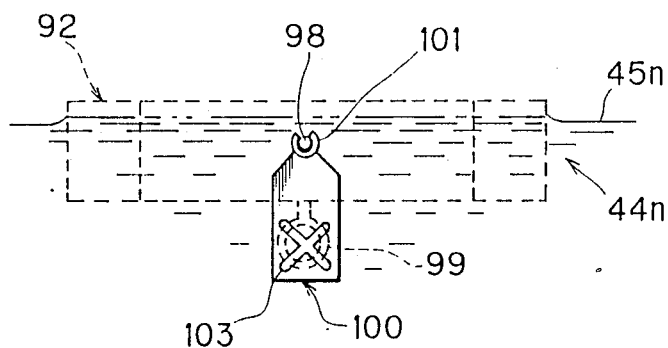
FIGS. 32 and 33 are front views for explaining how the first and second floats 92 and 100 operate.

First, FIG. 32 shows the state in which the specific gravity of the electrolyte is insufficient. In this state, the second indicating member 100 hangs down. Therefore, the "x" indicator 103 on the second float 100 extends downwardly and the "o" indicator 99 provided on the first float 92 is hidden by the second float 100. Therefore, the "x" indicator 103 on the second float 100 is visible through the window 6 (FIG. 1). In addition, in the assumed state, the first float 92 holding the second float 100 is capable of floating on the surface 45h of the electrolyte 44n. Therefore, the first float 92 is vertically displaced in response to a change in the level of the electrolyte surface 45n.

Figure 33:
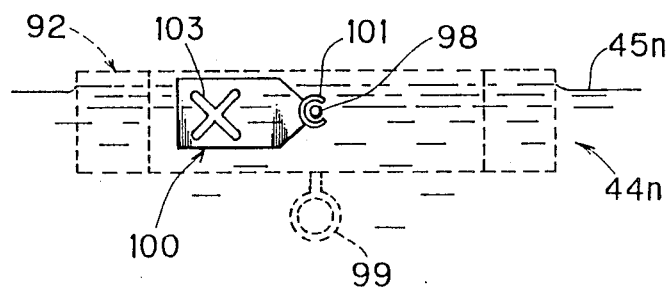

On the other hand, the state shown in FIG. 33 shows that the specific gravity of electrolyte 44n is proper. In this state, the second float 100 tends to rise. This rising movement of the second float 100 results in its rotating movement around the axis of the shaft 98. The direction of the rotating movement is arbitrary; for example, as shown in FIG. 33, the second float 100 rotates clockwise from the state of FIG. 32, whereby the second float 100 is received in the space 97 in the first float 92, FIG. 31 and is hidden by the front wall 95, FIG. 31. In front of the "o" indicator 99 on the first float 92, there is nothing which obstructs the view and hence the "o" indicator 99 is visible through the window 6, FIG. 1. Even in this state, the first float 92 moves vertically in response to any change in the level of the electrolyte surface 45n.

FIGS. 34 to 36 show an embodiment similar to those described above with reference to FIGS. 34 to 36, wherein only the first and second floats 92p and 100p are shown. The first float 92p, like the first float 92 shown in FIG. 30, is constructed to move vertically as it is guided by guide rails 90 and 91 on the frame member 10n. Therefore, the first float 92p is formed at its opposite ends with guide yokes 93p and 94p. A guide sleeve 104 extends across a space 97p defined between the front and rear walls 95p and 96p of the first float 92p to interconnect the front and rear walls 95p and 96p. The guide sleeve 104 forms a vertically extending passage and as lateral slot 105.

The second float 100p has a guide portion 106 adapted to be slidably received in said guide sleeve 104. The upper end of the guide portion 106 has a ring portion 107 which provides an "o" indicator 108. On the other hand, the lower end of the guide portion 106 has a block portion 109 substantially in the form of a cube provided with an "x" indicator 110.

The second float 100p is inserted in the space 97p in the first float 92p, as shown by an arrow 111, with the guide portion 106 being mounted in the guide sleeve 104 through the slot 105, whereby the second float 100p is supported for vertical movement. In addition, the end stops of the vertical movement of the second float 100p, are respectively defined by the ring and block portions 107 and 109 abutting against the guide sleeve 104. Further, the block portion 109, which has a relatively large volume, has the dual function of stabilizing the posture of the second float 100p and of increasing the buoyancy of the second float 100p, thereby making the operation of the second float 100p more sensitive.

Figure 34:
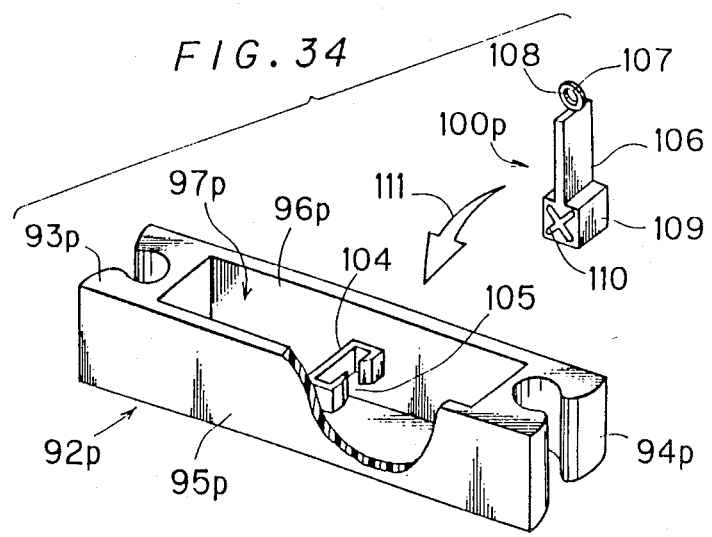
FIG. 34 is an enlarged perspective view showing, in an exploded fashion, a first float 92p and a second float 100p used in another example of an indicating device for indicating both the amount or level and the specific gravity of an electrolyte in a casing.

The operation of the first and second floats 92p and 100p shown in FIG. 34 will now be described with reference to FIGS. 35 and 36.

Figure 35:
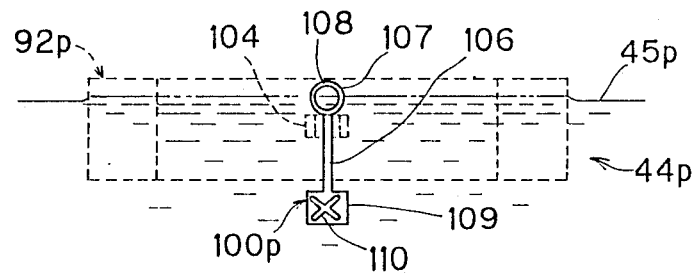
FIGS. 35 and 36 are front views for explaining how the first and second floats 92p and 100p shown in FIG. 34 operate.

First, FIG. 35 shows the state in which the specific gravity of the electrolyte 44p is insufficient. In this state, the second float 100p sinks until the ring portion 107 abuts against the guide sleeve 104. In this state, the "x" indicator 110 projects downwardly through the first float 92p and is visible through the window 6, FIG. 1.

While assuming such a state, the first float 92p holding the second float 100p is capable of floating on the surface 45p of the electrolyte 44p. Therefore, the first float 92p is vertically displaced in response to a change in the level of the elecrolyte surface 45p.

Figure 36:
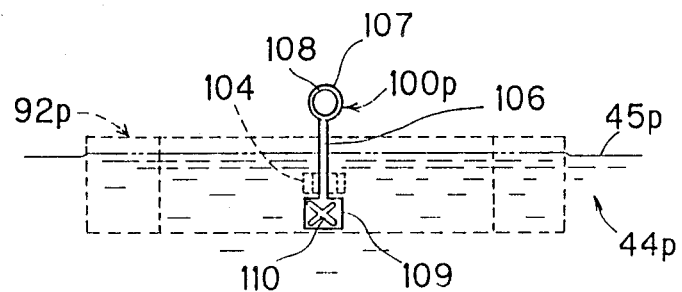

FIG. 36 shows the state in which the specific gravity of the electrolyte is in the proper range. In this state, the second float 100p floats upwardly relative to the first float 92p, until the block portion 109 abuts against the guide sleeve 104, whereby the "o" indicator 108 which was hidden by the first float 92p in FIG. 35, projects upwardly through the first float 92p, whereas the "x" indicator 110 becomes hidden by the first float 92p. Therefore, the "o" indicator 108 is visible through the window 6, FIG. 1. In this state the first float 92p holding the second float 100p also moves vertically in response to any change in the electrolyte surface level 45p.

In FIGS. 37 to 43 show another embodiment of the invention. A first float 92r used in this embodiment is similar in construction to the first float 92 used in the embodiment described with reference to FIGS. 30 to 33. That is, the first float 92r is held by the frame member 10n shown in FIG. 10 and adapted for vertical movement by being guided by the guide rails 90 and 91. Thus, guide yokes 93r and 94r for slidably receiving the guide rails 90 and 91 are provided at opposite ends of the first float 92r.

The longitudinally middle region of the first float 92r forms a space 114 defined by opposed walls 112 and 113. A shaft 115 extends across said space 114 to connect the pair of walls 112 and 113. Further, one wall 112 has a projecting stopper 116.

The first float 92r holds the second float 100r in a rotatable manner. The second float 100r is in the form of a plate as a whole, formed at one side thereof with a bearing portion 117 of C-shaped cross section. The second float 100r is inserted in the space 114 in the first float 92r, as shown by arrow 118, and receives the shaft 115 in the bearing portion 117, whereby the second float 100r is supported for a rotating movement around the axis of the shaft 115 with respect to the first float 92r.

Figure 37:
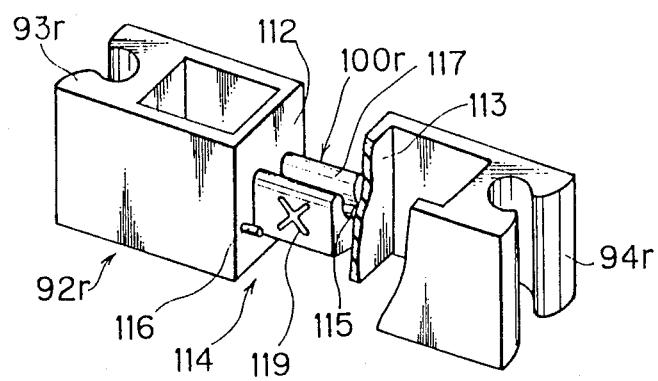
FIG. 37 is an enlarged perspective view showing the assembled state of a first float 92r and second float 100r used in another example of an indicating device for indicating both the amount or level and the specific gravity of an electrolyte in a casing.
Figure 38:
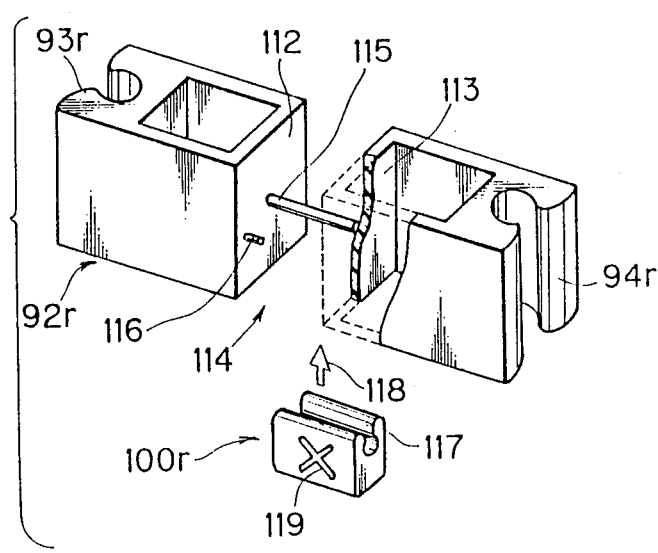
FIG. 38 is an enlarged perspective view showing, in an exploded fashion, the first and second floats 92r and 100r shown in FIG. 37.
Figure 39:
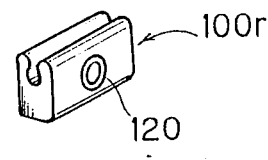
FIG. 39 is a perspective view showing the surface of the second float 100r opposite to the surface shown in FIG. 38.

One surface of the second float 100r has an "x" indicator 119 applied thereto, as shown in FIGS. 37 and 38. The other surface of the second float 100r, as shown in FIG. 39, has an "o" indicator 120 applied thereto.

The operation of the first and second floats 92r and 100r will now be described with reference to FIGS. 40 to 43.

First, FIGS. 40 and 41 show the state in which the specific gravity of the electrolyte 44r is insufficient. In this state, the second float 100r hangs down, so that the "x" indicator 119 can be seen through the window 6, FIG. 1. The first float 92r holding the second float 100r is capable of floating on the surface 45r of the electrolyte 44r. Therefore, the first float 92r moves vertically in response to any change in the electrolyte surface level 45r.

FIGS. 42 and 43 show the state in which the specific gravity of the electrolyte 44r is in the proper range. In this state, the second float 100r tends to move upwardly. The upward movement of the second float 100r results in a turning or rotating movement around the axis of the shaft 115. Since the second float 100r, when in the sunken state, abuts against the stopper 116, the direction of the rotation movement of the second float 100r is limited to the counterclockwise direction. The function of the stopper 116 is substantially the same as that of the movement range limiting members 29 and 30 shown in FIG. 2 and other figures. When the second float 100r is turned counterclockwise from the state of FIG. 41, it takes the posture shown in FIGS. 42 and 43. Therefore, the "o" indicator 120 can be seen through the window 6, FIG. 1. In this state, the first float 92r holding the second float 100r is also vertically displaced in response to any change in the electrolyte surface level 45r.

Figure 44:
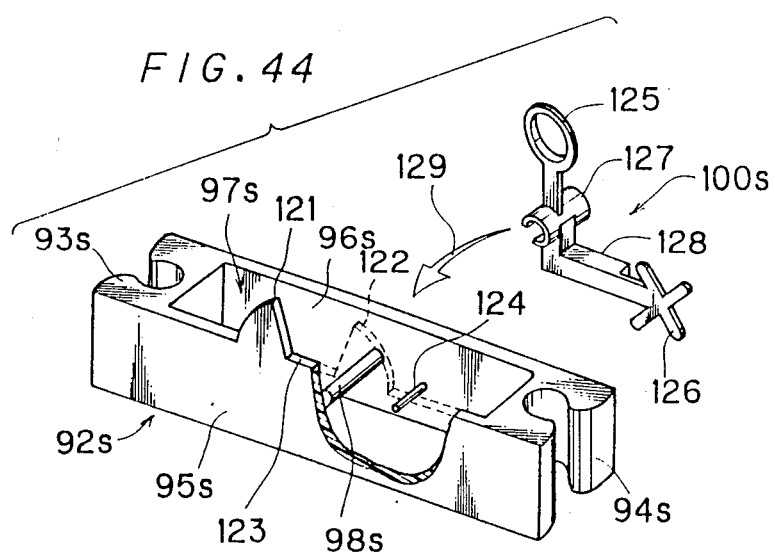
FIG. 44 is an enlarged perspective view showing, in an exploded fashion, a first float 92s and second float 100s used in another example of an indicating device for indicating both the amount or level and the specific gravity of an electrolyte in a casing.
Figure 45:
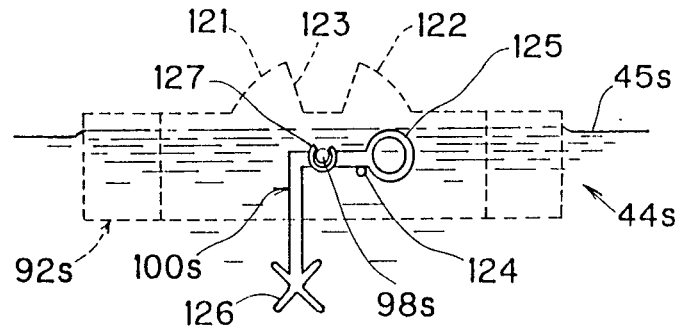
FIGS. 45 and 46 are front views for explaining how the first and second floats 92s and 100s shown in FIG. 44 operate.
Figure 46:
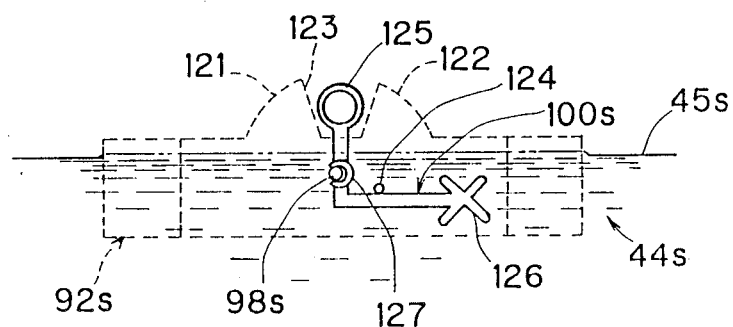

A further embodiment of the invention is shown in FIGS. 44 to 46. The first float 92s used in this embodiment is also supported for vertical movement by a frame member 10n shown in FIG. 30. For this purpose the first float 92s has guide yokes 93s and 94s at its opposite ends for slidably receiving guide rails 90 and 91, respectively, formed on the frame member 10n.

The first float 92s, as the first float 92 shown in FIG. 31, has a front wall 95s and a rear wall 96s, and a space 97s is defined between these front and rear walls 95s and 96s. A shaft 98s extends across said space 97s and connects the front and rear walls 95s and 96s. The upper end of the front wall 95s has a pair of blindfolds 121 and 122 in the form of sectors symmetrically projecting therefrom. A notch 123 is formed between the blindfolds 121 and 122. On the other hand, the rear wall 96s is provided with a stopper 124 projecting therefrom into the space 97s.

The second float 100s is L-shaped as a whole. One end of the second float has an "o" indicator 125 and the other end has an "x" indicator 126. A portion of the second float 100s extending from the bend is formed as a bearing 127 of C-shaped cross section. Further, a thick-walled portion 128 extends from the bearing 127 to the end carrying the "x" indicator 126. The thick-walled portion 128 increases the buoyancy acting on the second float 100s to make the operation of the second float 100s more sensitive.

The second float 100s, as shown by arrow 129 in FIG. 44, is inserted in the space 97s in the first float 92s, with the shaft 98 received in the bearing 127, whereby the second float 100s is supported for rotating around the axis of the shaft 98s.

The manner of operation of the first and second floats 92s and 100s will now be described with reference to FIGS. 45 and 46.

First, FIG. 45 shows the state in which the specific gravity of the electrolyte 44s is insufficient. In this state, the second float 100s tends to sink whereby it tries to rotate thereby positioning the opposite ends with the indicator 125 and 126 in a lower location. However, during such rotating movement, the end with the "o" indicator 125 abuts against the stopper 124, as shown in FIG. 45. Thus, the second float 100s cannot rotate any further. Therefore, the second float 100s takes the posture in which the "x" indicator 126 alone is exposed through the first float 92s. Therefore, the "x" indicator 126 can be seen through the window 6, FIG. 6. In addition, the first float 92 is capable of floating on the surface 45s of the electrolyte 44s while holding the second float 100s. Thus, in response to any change in the electrolyte surface level 45s, the first float 92s is vertically displaced.

FIG. 46 shows the state in which the specific gravity of the electrolyte 44s is in the proper range. In this state, the second float 100s tends to rise. This rising movement of the second float 100s results in a rotating movement of the second float 100s around the axis of the shaft 98s whereby the opposite ends of the second float 100s are positioned above the level of the bearing 127. Since the second float 100s, in the state of FIG. 45, abuts against the stopper 124, it can rotate only counterclockwise around the axis of the shaft 98s. When the second float 100s rotates counterclockwise, a stop is defined when the arm with the "x" indicator 126 abuts against the stopper 124. In this state, the "x" indicator 126 is hidden by the first float 92s, while the "o" indicator 125 appears through the notch 123 formed between the blindfolds 121 and 122. Therefore, the "x" indicator 125 can be seen through the window 6, FIG. 1. In the state shown in FIG. 46, the first float 92 holding the second float 100s can move vertically in response to any change in the electrolyte surface 45s.

In addition, one blindfold 122 makes the "o" indicator 125 invisible when the second float 100s is in an intermediate state between the states of FIGS. 45 and 46.

FIGS. 47 and 48 show a further embodiment of the invention. The indicating device 9t shown therein is constructed to indicate both the amount or level and the specific gravity of the electrolyte. The indicating device 9t has a construction similar to that of the indicating device 9c shown in FIG. 19. The frame member 10t of the indicating device 9t is provided with a pair of guide rails 62t and 63t extending vertically. First and second floats 64t and 65t are supported for vertical movement on these guide rails 62t and 63t.

The first float 64t indicates only the amount or level of electrolyte and has a specific gravity such that it always floats on the surface of the electrolyte.

On the other hand, the second float 65t is disposed below the first float 64t and indicates only the specific gravity of the electrolyte. For making it easier to distinguish the two indications from each other, the second float 65t has a color different from that of the fist float 64t.

This first float, i.e. the electrolyte level indicating float 64t has a shield 130 for hiding the second float, i.e. the specific gravity indicating float 65t from view through the window when the specific gravity indicating float 65t is in the floating state. In this embodiment, the electrolyte level indicating float 64t has a back wall 131 in the same manner as the shield 130. Therefore, when the specific gravity indication float 65t floats, it is positioned in the space between the shield 130 and the back wall 131. The formation of such back wall 131 is significant in that it prevents the buoyance on the electrolyte level indicating float 64t from being modified by bubbles when the electrolyte level indicating float 64t moves vertically. However, the means for preventing deviation in the vertical movement of the electrolyte level indicating float 64t is not limited to the formation of such a back wall 131; said means can also be provided by adding buoyancy increasing means. If the electrolyte level indicating float 64t has a shield 130 and a back wall 131 such as those shown, the arrangement of the indicating device is substantially the same when seen from the front and when seen from the back. Therefore, there is no need to take directionality into account during the installing of the indicating device 9t in the casing 1, so that the operation is quickly done since there is no danger of an incorrect insertion. In other words, the back wall 131 is interchangeable with respect to the shield 130.

In the state in which the specific gravity of the electrolyte is in the proper range, the specific gravity indicating float 65t maintains its floating state but is hidden by the shield 130 of the electrolyte level indicating float 64t and cannot be seen from the outside through the window. In response to any change of the electrolyte surface level, the electrolyte level indicating float 64t moves vertically, indicating the position corresponding to the electrolyte level through the window.

On the other hand, in the state in which the specific gravity of the electrolyte is insufficient, the specific gravity indicating float 65t sinks and hence it is separated from the electrolyte level indicating float 64t. At this time, the specific gravity indicating float 65t can be seen through the window, indicating that the specific gravity of the electrolyte is insufficient. In addition, the lower ends of the guide rails 62t and 63t are formed with stops 132 and 133 in order to ensure that the specific gravity indicating float 65t will not come out of view through the window when it sinks.

Figure 49:
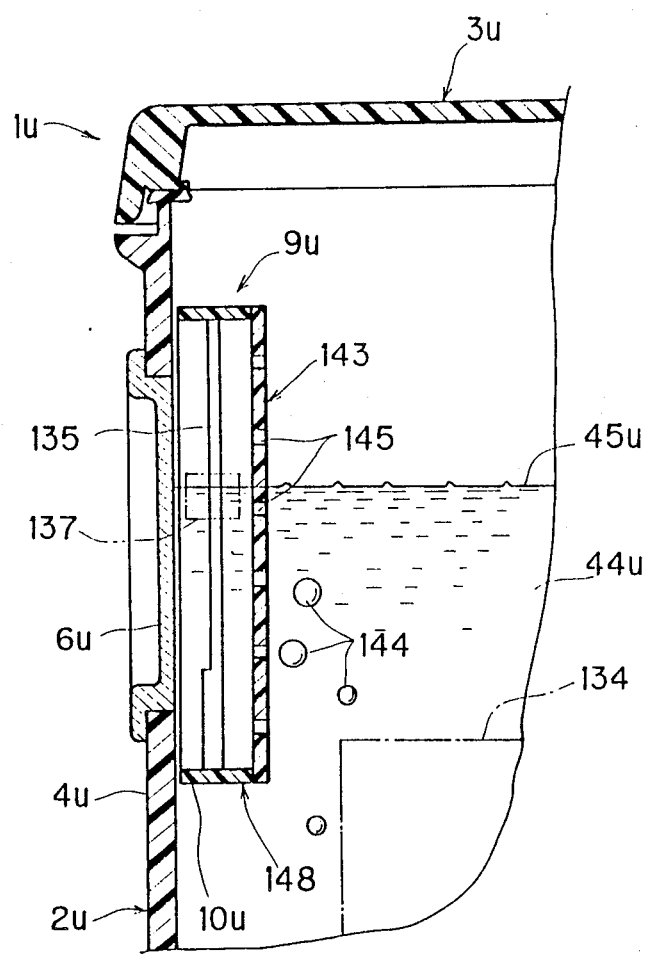
FIG. 49 is a sectional view showing a portion of a storage battery according to another embodiment of the invention.
Figure 50:
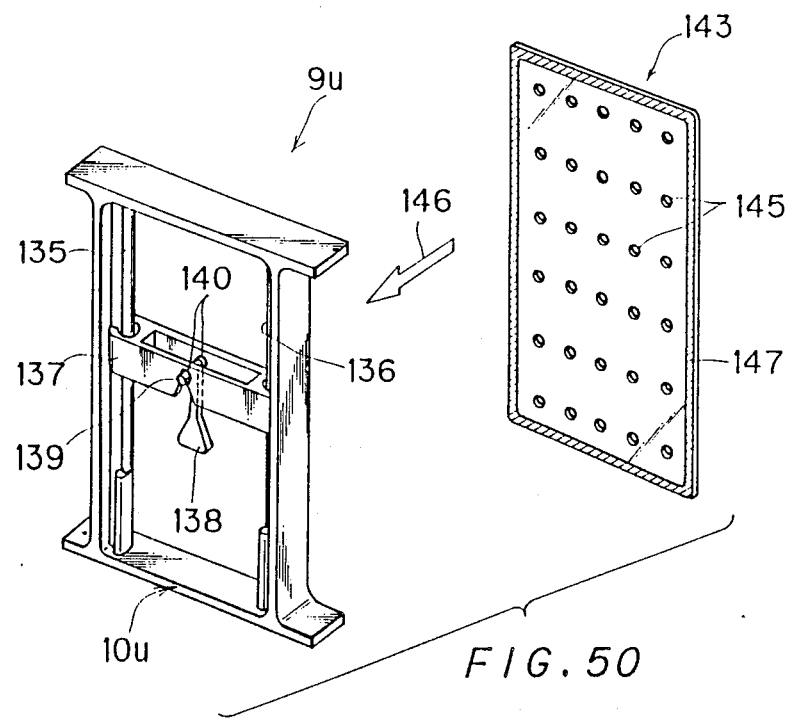
FIG. 50 is a perspective view showing an indicating device 9u and a bubble preventing plate 143 shown in FIG. 49.
Figure 51:
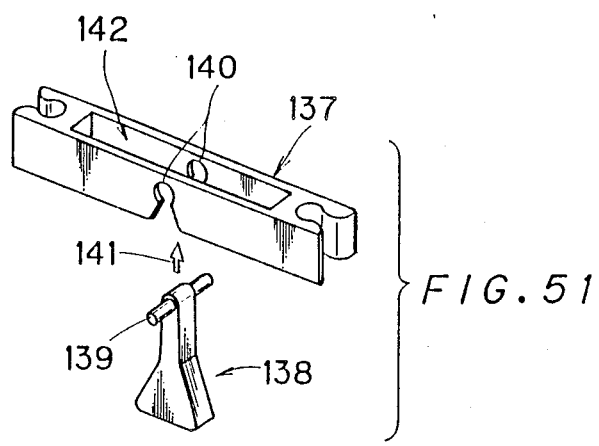
FIG. 51 is an enlarged perspective view showing, in an exploded fashion, floats 137 and 138 included in the indicating device 9u shown in FIG. 50.

An embodiment shown in FIGS. 49 to 51 makes it possible to advantageously solve the following problem.

This problem is caused by bubbles produced in the electrolyte. Such bubbles are produced in cases when casing 1, or pure water is poured into the electrolytic when the storage battery is charged, when the storage battery is vibrated and so is the electrolyte, and when the temperature of the storage battery, used for an automobile, for example, is raised, e.g., when the bonnet of the automobile is heated by the sun. Since the float is positioned at least partly in the electrolyte, bubbles produced tend to adhere to the float.

However, where bubbles adhere more or less to the float, the buoyance acting on the float is increased. Particularly in the case of the specific gravity indicating float, an increase in the buoyancy due to bubbles adhering to the float, results in the float being maintained floating when it should sink, thus leading to a decrease in the reliability of the indication. Further, when bubbles adhere only to one side of the level indicating float, the float undesirably tilts, with the result that the smooth vertical movement of the float can no longer be maintained.

In each case, adhesion of bubbles to the float leads to the problem of impeding the proper action of the float.

FIG. 49 is a sectional view of a casing 1u comprising a body 2u and a cover 3u. The lateral wall 4u of the body 2u is formed with a window 6u.

The body 2u has electrode plates 134 installed in a position shown in phantom lines. An electrolyte 44u is contained in the body 2u. The electrolyte 44u defines an electrolyte surface level 45u.

The indicating device 9u is disposed along the inner side of the window 6u. The indicating device 9u, as best shown in FIG. 50, has a frame member 10u. The frame member 10u is provided with a pair of vertically extending guide rails 135 and 136. A float 137 is supported for vertical movement by these guide rails 135 and 136. The float 137 is constructed to solely indicate the amount or level of the electrolyte 44u and has a specific gravity such that it always floats on the surface 45u, of the electrolyte 44u FIG. 49.

On the other hand, another float 138 is held by the float 137. The float 138 moves vertically only in response to a change in the specific gravity of the electrolyte 44u. That is, the float 138 is made of a resin having a specific gravity such that when the specific gravity of the electrolyte 44u is in the proper range, it floats but when the specific gravity is insufficient, it sinks. The float 138 has a shaft 139 at one end thereof. On the other hand, the float 137 has bearing portions 140 each having a downwardly opened notch. When the shaft 139 is inserted into the bearing portions 140 in the direction shown by arrow 141 in FIG. 51, it is received in the bearing portions 140 by resisting the elasticity of the resin forming the float 137, whereby, the float 139 is supported for rotating movement around the axis of the shaft 139 with respect to the float 137.

In the indicating device 9u, the surface level 45u of the electrolyte 44u is indicated by the position of the float 137. If the specific gravity of the electrolyte 44u is in the proper range, the float 138 turns around the axis of the shaft 139 to rise until it enters the space 142 defined in the float 137. Therefore, if the specific gravity of the electrolyte 44u is in the proper range, the float 138 is hidden by the float 137 and cannot be seen through the window 6u. On the other hand, if the specific gravity of the electrolyte 44u is insufficient, the float 138 rotates around the axis of the shaft 139 to sink. Thus, the float 138 hangs down from the float 137, as shown in FIG. 50. Therefore, the float 138 together with the float 137 can be visually inspected through the window 6u.

Preferably, the floats 137 and 138 are colored differently to make them more clearly distinguishable.

As shown in FIGS. 49 and 50, a bubble preventing plate 143 is used in this embodiment. To prevent passage of bubbles produced in the electrolyte 44u while allowing passage of the electrolyte 44u, the bubble preventing plate 143 has a number of circular through-holes 145. The bubble preventing plate 143, as shown by arrow 146 in FIG. 50, is brought into contact with one end surface of the frame member 10u of the indicating device 9u and bonded to the frame member 10u in a peripheral region 147 specified by shading. This bonding may be effected by using an adhesive agent, by thermal adhesion, by supersonic welding or the like, depending upon the materials which form the frame member 10u and the bubble preventing plate 143.

When the bubble preventing plate 143 is fitted to the frame member 10u, as shown in FIG. 49, there is provided a container 148 defined by the bubble preventing plate 143, by walls of the frame member 10u, by part of the body 2u and by the window 6u. The floats 137 and 138 are positioned in this container 142. Therefore, there is no difference in the conditions of the electrolyte 44u, i.e., the position of the electrolyte surface level 45u and the specific gravity of the electrolyte 44u, between the interior and exterior of the container 148. Thus, the floats 137 and 138 can respond to conditions of the electrolyte 44u which are to be defected. Since bubbles 144 cannot pass through the bubble preventing plate 143, there is no possibility of bubbles entering the container 148. As a result, there is no possibility of bubbles adhering to the floats 137 and 138.

FIGS. 52 to 55 show other examples of bubble preventing plates.

Figure 52:
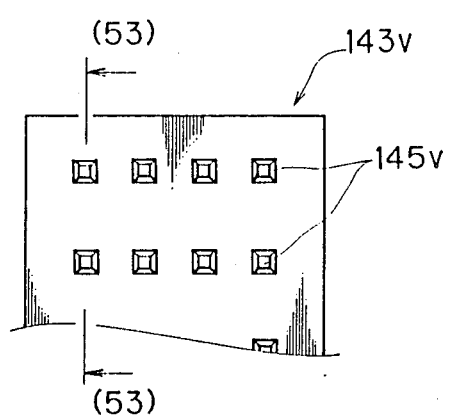
FIG. 52 is a fragmentary front view of a modification of a bubble preventing plate.
Figure 53:
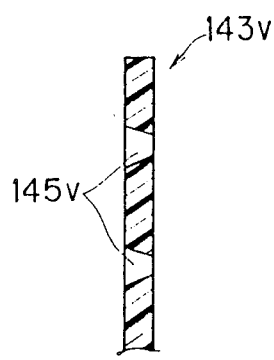
FIG. 53 is a sectional view taken along the line (53)—(53) in FIG. 52.

A bubble preventing plate 143v shown in FIGS. 52 and 53 has square through-holes 145v. These through-holes may be tapered in cross section, as best shown in FIG. 53.

Figure 54:
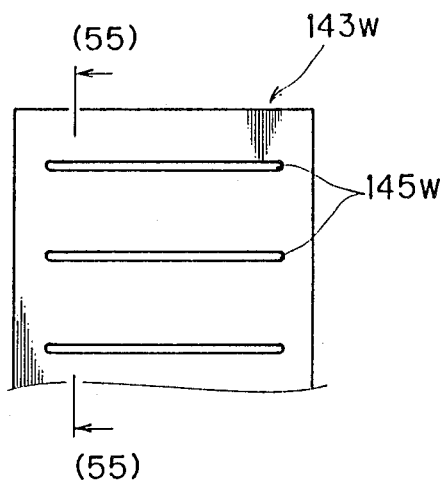
FIG. 54 is a fragmentary front view of another modification of a bubble preventing plate.
Figure 55:
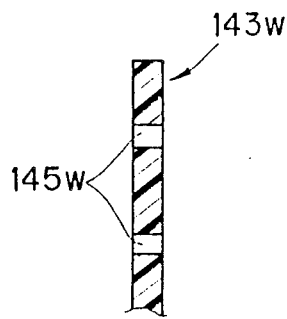
FIG. 55 is a sectional view taken along the line (55)—(55) in FIG. 54.

A bubble preventing plate 143w shown in FIGS. 54 and 55 has horizontally extending through-holes 145w.

The significance of the illustration of these bubble preventing plates 143v and 143w lies in showing that the shape, size and number of through-holes to be provided therein are arbitrary. Therefore, through-holes may be formed in other manners than those for the through-holes 145v and 145w illustrated. Further, the through-holes 143, 143v and 143w in the bubble preventing plates 145, 145v and 145w have been provided by forming holes extending through the plate-like members in the direction of the thickness thereof; however, a bubble preventing plate itself may be formed of a net-like material, a non-woven fabric of coarse mesh or the like.

FIGS. 56 to 61 show a further embodiment of the invention.

The illustrated storage battery, as shown in FIG. 59, has a casing 1x with a body 2x and a cover 3x for closing the upper opening of the casing.

Figure 61:
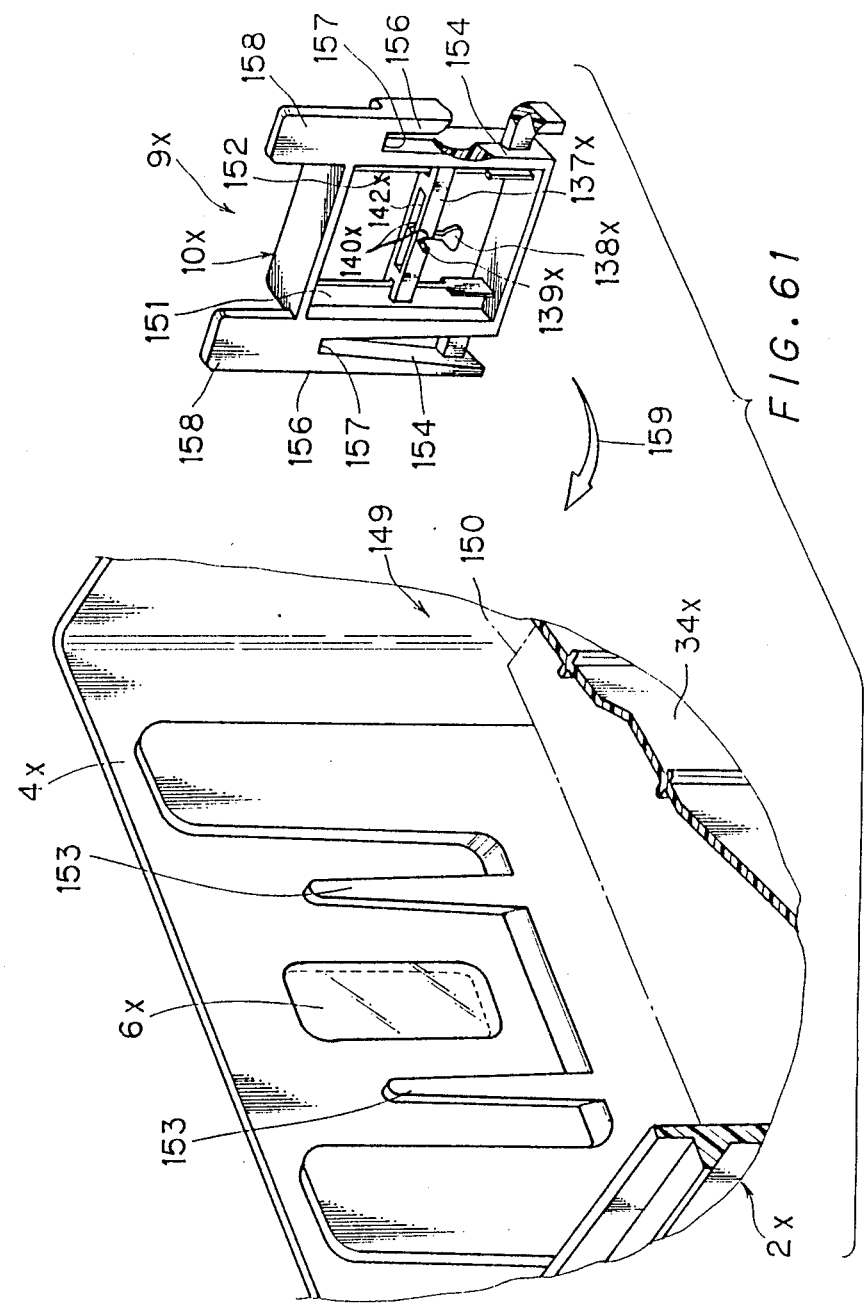
FIG. 61 is a perspective view showing the indicating device 9x separated from the casing body 2x.

For example, as shown in FIG. 61, the body 2x has its interior partitioned by partition walls including a wall 34x, into a plurality of cells including a cell 149. The lateral wall 4x of the body 2x forming one wall which defines the endmost cell 149 has a window 6x through which the interior of the cell 149 can be seen.

An electrode assembly 150 is installed in the cell 149 as shown in phantom lines in FIG. 61. An electrolyte, not shown, is contained in the cell 149.

To indicate the electrolyte conditions, i.e., the amount and specific gravity of the electrolyte in the illustrated embodiment, an indicating device 9x for indicating changes in the electrolyte conditions, is provided inside the window 6x. The indicating device 9x with its frame member 10x is shown in a perspective view in FIG. 61 separate from the body 2x. The frame member 10x has a pair of vertically extending guide rails 151 and 152. A first float 137x is received by the guide rails 151 and 153, at opposite float ends and is thereby supported for vertical movement along the guide rails 151 and 152. A second float 138x is rotatable with respect to the first float 137x.

The first and second floats 137x and 138x are constructed in substantially the same way as in the floats 137 and 138 described with reference to FIGS. 49 to 51. That is, the second float 138x has a shaft 139x, while the first float 137x has a bearing portion 140x for receiving said shaft 139x. Further the first float 137x has a space 142x for receiving the second float 138x when the latter floats.

The embodiment shown in FIGS. 56 to 61 is constructed for attaching the frame member 10x of the indicating device 9x to the lateral wall 4x of the body 2x.

Figure 56:
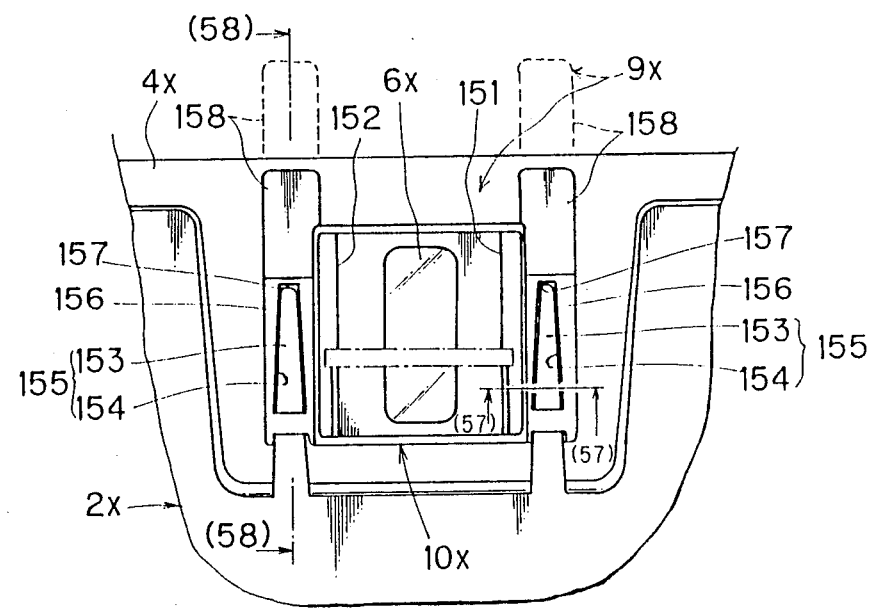
FIG. 56 is a front view of the inner surface, showing a portion of the lateral wall 54x of the battery casing body 2x according to another embodiment of the invention, the view showing an indicating device 9x in its mounted state.
Figure 57:
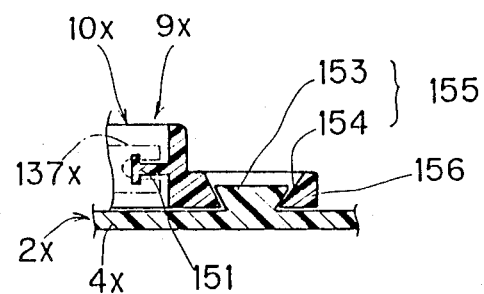
FIG. 57 is an enlarged sectional view taken along the line (57)—(57) in FIG. 56.

As can seen from FIG. 57 which is a sectional view taken along the line (57)—(57) in FIG. 56 showing the state in which the indicating device 9x is mounted on the electrolytic vessel body 2x, the construction for attaching the frame member 10x to the lateral wall 4x comprises a joint mechanism 155 having a combination of a dovetail 153 and a dovetail groove 154 for receiving the dovetail 153. In this embodiment, the dovetail 153 is provided on the lateral wall 4x while the dovetail groove 154 is provided on the frame member 10x. However, the positional relation between the dovetail and the dovetail groove may be reversed.

Figure 60:
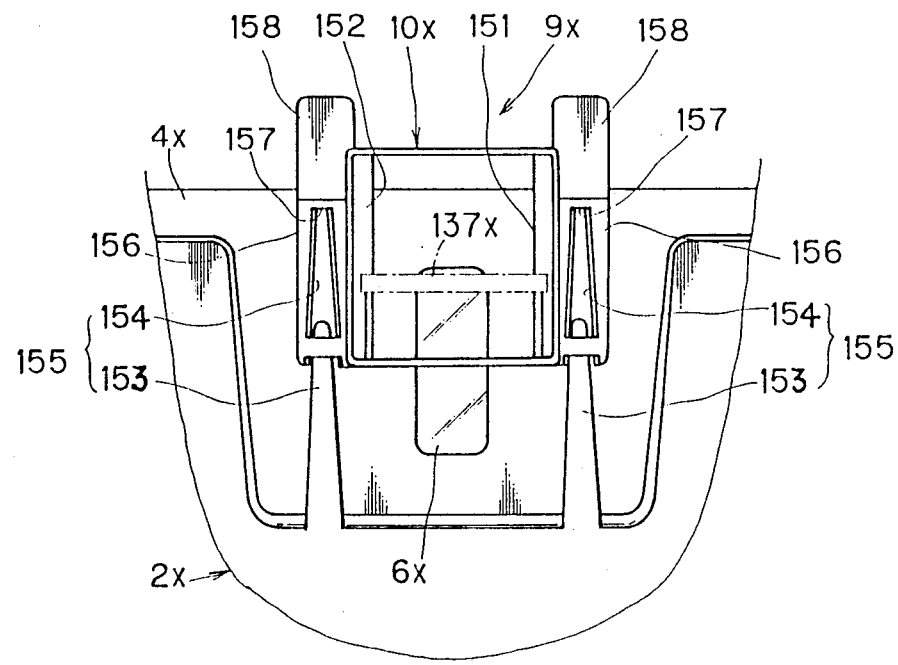
FIG. 60 is a front view corresponding to FIG. 56 for showing the indicating device 9x in the halfway mounted state.

The dovetails 153, as shown in FIGS. 60 and 61, are positioned as a pair on opposite sides of the window 6x, extending vertically. Each dovetail 152 has a width which narrows toward the top.

On the other hand, the frame member 10x is provided with a pair of vertical walls 156 which extend vertically and parallelly. Each of the dovetail grooves 154 on the respective vertical walls 156 extend vertically. Each dovetail groove also has a width which narrows toward the top. Each dovetail groove 154 has a terminal end wall 157 formed on its upper end. Further, each vertical wall 156 has an upper end which projects from the entire shape of the frame member 10x, the upper end forming a stopper 158 as will be described below.

In installing the indicating device 9x in the body 2x, the surface of the frame member 10x facing the viewer as seen in FIG. 61 is fitted, as shown by arrow 159 in FIG. 61, to the surface of the lateral wall 4x which is facing the reader as seen in FIG. 61. Thus, the frame member 10x is brought into the position shown in FIG. 60. In FIG. 60, the upper end portions of the dovetails 153 are received in the lower end portions of the corresponding dovetail grooves.

Thereafter, the frame member 10x is pushed downwardly from the state shown in FIG. 60, whereby the dovetails 153 slide in the dovetail grooves 154. Since the dovetails 153 and dovetail grooves 154 have a width which narrows toward the top, as described above, the fitting relation between the dovetails 153 and the dovetail grooves 153 becomes more intimate as the slide movement proceeds. The end of the downward slide movement of the frame member 10x is defined by the upper ends of the dovetails 153 abutting against the terminal walls 157 of the dovetail grooves 154, as shown in FIGS. 56 and 58. In this state, the dovetails 153 are engaged with the dovetail grooves 154 quite intimately, so that the frame member 10x can hardly move not only in the down ward direction as mentioned above, but also in the transverse and horizontal directions.

After the indicating device 9x has been installed in the body 2x, the cover 3x is joined to the body 2x, as shown in FIG. 59. For this joining, thermal adhesion, for example, is used. As can be seen from FIG. 59, a portion of the cover 3x or the resin once melted by the thermal adhesion process, is joined or contacted with the upper ends of the stoppers 158. Thus, the frame member 10x is limited also for against upward displacement.

The invention has so far been described with reference to various embodiments described above; modifications are possible within the scope of the appended claims.

For example, as for the shape of the frame member of the indicating device, it may have a simple quadrangular or some other shape.

As for the means for attaching such frame member to the electrolytic vessel, other fitting combinations than those shown may be applied. Further, without employing such fitting combinations, such means as an adhesive agent and thermal adhesion may be employed.

Although the present invention has been described and illustrated in detail, it is clearly understood that the same is by way of illustration and example only and is not to be taken by way of limitation, the scope of the present invention being limited only by the terms of the appended claims.

What is claimed is:

1. A storage battery, comprising a casing for containing an electrolyte, a window (6) in said casing for viewing the interior of the casing through said window in a lateral wall (4) of the casing, indicating means (9t) installed in said casing behind said window for indicating changes in the electrolyte liquid level and in the specific gravity of the electrolyte, said indicating means comprising a pair of guide rails (62t, 63t) vertically extending in parallel to said lateral wall in which said window is formed, first and second floats (64t and 65t) disposed between said guide rails in a position visible through said window, said floats having at their respective opposite ends guide portions slidably fitted on said pair of guide rails, said first float (64t) having a specific gravity so that the first float always floats on the liquid surface of the electrolyte for indicating an electrolyte level in said casing, said second float (65t) being disposed below said first float (64t) and having such a buoyancy that the second float will rise and sink according to changes in the specific gravity of the electrolyte for indicating the specific gravity of the electrolyte, and said first float (64t) having a shield (130) for hiding said second float (65t) from the field of vision through said window when said second float (65t) is floating.

2. The storage battery of claim 1, further comprising horizontal members (10t) interconnecting said pair of guide rails to form a frame, and means attaching said frame to said lateral wall of said casing, so that said frame is located behind said window.

3. The storage battery of claim 2, wherein said attaching means comprise opposed positioning raised wall portions (34, 35) rising from an inner surface of said lateral casing wall provided with said window, said raised wall portions extending vertically on opposite sides of said window, and wherein said frame has two opposite outer lateral abutment surfaces located for cooperation with said raised positioning wall portions for holding said frame in a defined position behind said window.

4. The storage battery of claim 3, comprising partition walls forming a plurality of cells separated from each other by said partition walls, and wherein said raised positioning wall portions are provided by two adjacent walls which are selected from said partition walls (34, 35) and other lateral walls of said casing.

5. The storage battery of claim 3, wherein said outer lateral abutment surfaces have vertically extending notches (20, 21, 22, 23), and wherein said attaching means further comprise guide ribs (36, 37) extending vertically and fitting into said notches, whereby said frame is positioned with a plane defined by said frame in parallel to said lateral casing wall provided with said window.

6. The storage battery of claim 5, wherein said attaching means further comprise a positioning rib (39, 41) extending on the same line as at least one of said guide ribs in such a manner as to form a step surface (38, 40) facing upwardly, said frame abutting against said step surface for fixing the frame against downward displacement.

7. The storage battery of claim 3, wherein said frame has a front surface (48) and a rear surface (49) which determine the thickness dimension of said frame, and said attaching means further comprise upwardly extending guide ribs (50, 51) formed at a position spaced by a distance corresponding to the thickness of said frame from the inner surface of said lateral casing wall (4a), whereby said front surface contacts the inner surface of said lateral casing wall (4a) and said rear surface contacts said guide ribs, so that a plane defined by said frame is positioned in parallel to said lateral casing wall.

8. The storage battery of claim 7, wherein said attaching means further comprise an upwardly directed positioning surface (52) on the inner surface of said casing, whereby a lower surface of said frame abuts against said positioning surface, for fixing the frame against downward displacement.

9. The storage battery of claim 1, wherein said casing of said battery comprises a casing body (2) and a cover (3) closing an upper opening of said battery casing body, and wherein said attaching means comprise a lower surface portion of said cover for limiting an upward displacement of said frame abutting against said lower surface portion of said cover.

10. The storage battery of claim 1, wherein said frame forms a quadrangle comprising opposed upper and lower sides (12, 13) and opposed left-hand and right-hand sides (14, 15), said frame being installed so that said upper and lower sides and said left-hand and right-hand sides extend along an inner surface of said lateral casing wall.

11. The storage battery of claim 10, wherein said upper and lower sides have attaching portions (16, 17, 18, 19) which extend leftward and rightward beyond said left-hand and right-hand sides.

12. The storage battery of claim 2, wherein said attaching means comprise a dovetail joining device (155) comprising a combination of a vertically extending dovetail (153) and a dovetail groove (154).

13. The storage battery of claim 12, wherein said dovetail is formed in said lateral casing wall, and wherein said dovetail groove is formed in said frame.

14. The storage battery of claim 13, wherein said dovetail and said dovetail groove have a width which narrows toward the top.

15. The storage battery of claim 1, further including container means (148) for receiving said first and second float means, said container means having a wall at least a portion of which forms a bubble preventing plate (143, 143v, 143w) which allows passage of the electrolyte but which prevents passage of bubbles produced in the electrolyte.

16. The storage battery of claim 10, further including a bubble preventing plate (143) which allows passage of the electrolyte but which prevents passage of bubbles produced in the electrolyte, said bubble preventing plate being connected to the upper, lower, left-hand and right-hand sides of said frame (10u) at their respective end faces.

17. A storage battery, comprising a battery casing for containing an electrolyte, a window in a lateral casing wall of said casing for viewing the interior of the casing through said window, an indicating device (9x) for indicating changes in the state of the electrolyte in said casing, said indicating device comprising, a frame member (10x) separate from said battery casing, float means disposed in a position where it can be seen through said window (6x) and held by said frame member (10x) so that said float means is vertically movable according to changes in the state of the electrolyte, and dovetail attachment means (155) for securing said frame member (10x) to an inner surface of said lateral casing wall (4x), said dovetail attachment means (155) comprising a vertically extending dovetail (153) and a dovetail groove (154) along the inner surface of said lateral casing wall (4x) next to said window (6x).

18. The storage battery of claim 18, wherein said casing of said battery comprises a casing body (2) and a cover (3) closing an upper opening of said battery casing body, and wherein said attaching means comprise a lower surface portion of said cover for limiting an upward displacement of said frame abutting against said lower surface portion of said cover.

19. The storage battery of claim 17, wherein said float means comprises a float adapted to move vertically in response to a change in the level of the surface of the electrolyte.

20. The storage battery of claim 17, wherein said float means comprises a float adapted to move vertically in response to a change in the specific gravity of the electrolyte.

21. The storage battery of claim 17, wherein said float means comprises a rotatable float and means supporting said rotatable float for a rotating movement in a vertical plane with respect to said frame member.

22. The storage battery of claim 17, wherein said float means comprises a float supported for vertical displacement with respect to said frame member.

23. The storage battery of claim 17, wherein said float means comprises a float supported for a rotating movement in a vertical plane and for a vertical displacement.

24. The storage battery of claim 23, wherein said rotating movement of said float in a vertical plane takes place in response to a change in the specific gravity of the electrolyte, while said vertical displacement of said float takes place in response to a change in the surface level of the electrolyte.

25. The storage battery of claim 17, wherein said float means comprises a first float supported for vertical displacement with respect to said frame member, and a second float supported for vertical movement with respect to said first float, said first float being adapted to travel vertically in response to a change in the level of the surface of the electrolyte while said second float is adapted to move vertically in response to a change in the specific gravity of the electrolyte.

26. The storage battery of claim 17, wherein said dovetail groove is formed in said lateral casing wall (4a), and wherein said dovetail groove is formed in said frame member (10k).

27. The storage battery of claim 26, wherein said dovetail and said dovetail groove have a width which narrows toward the top.

28. The storage battery of claim 17, further including container means (148) for receiving said float means, said container means having a wall at least a portion thereof forming a bubble preventing plate which allows passage of the electrolyte but which prevents passage of bubbles produced in the electrolyte.

* * * * *

UNITED STATES PATENT AND TRADEMARK OFFICE
CERTIFICATE OF CORRECTION

PATENT NO. : 4,874,679
DATED : October 17, 1989
INVENTOR(S) : Shiro Miyagawa

It is certified that error appears in the above-identified patent and that said Letters Patent is hereby corrected as shown below:

Title page:

In [54], please correct the Title to read:
--STORAGE BATTERY WITH AN INDICATING DEVICE--;

In [30] Foreign Application Priority Data, line 2, please correct to read: --Nov. 5, 1987 [JP] Japan.... 62-280201--;

In [57] the Abstract, line 1, replace "electrolytic" by --electrolyte--;
line 5, replace "conditions' " by --conditions,--;
line 15, replace "the" (2.occurrence) by --that--;
line 18, replace "from the above" by --from above--;
line 20, replace "an bubble" by --a bubble--.

UNITED STATES PATENT AND TRADEMARK OFFICE
CERTIFICATE OF CORRECTION

PATENT NO. : 4,874,679

DATED : October 17, 1989

INVENTOR(S) : Shiro Miyagawa

It is certified that error appears in the above-identified patent and that said Letters Patent is hereby corrected as shown below:

In claim 18, line 1, (column 22, line 56), replace "claim 18" by --claim 17--.

Signed and Sealed this

Fifth Day of February, 1991

*Attest:*

HARRY F. MANBECK, JR.

*Attesting Officer*      *Commissioner of Patents and Trademarks*